US010769166B1

(12) United States Patent
Hankins

(10) Patent No.: US 10,769,166 B1
(45) Date of Patent: Sep. 8, 2020

(54) DISTRIBUTED INTEGRATED PLATFORMS AS A SERVICE NETWORK

(71) Applicant: Richard Ruel Kenneth Hankins, Keller, TX (US)

(72) Inventor: Richard Ruel Kenneth Hankins, Keller, TX (US)

( * ) Notice: Subject to any disclaimer, the term of this patent is extended or adjusted under 35 U.S.C. 154(b) by 0 days.

(21) Appl. No.: 16/188,154

(22) Filed: Nov. 12, 2018

Related U.S. Application Data

(63) Continuation-in-part of application No. 15/959,202, filed on Apr. 21, 2018, which is a continuation of application No. 14/883,528, filed on Oct. 14, 2015, now Pat. No. 9,953,070.

(60) Provisional application No. 62/143,138, filed on Apr. 5, 2015, provisional application No. 62/741,411, filed on Oct. 4, 2018.

(51) Int. Cl.
    *G06F 7/04* (2006.01)
    *G06F 16/25* (2019.01)
    *G06F 21/62* (2013.01)

(52) U.S. Cl.
    CPC ........ *G06F 16/254* (2019.01); *G06F 21/6245* (2013.01)

(58) Field of Classification Search
None
See application file for complete search history.

(56) References Cited

U.S. PATENT DOCUMENTS

2008/0005086 A1 * 1/2008 Moore .................. G06F 16/955

* cited by examiner

*Primary Examiner* — Brandon S Hoffman
(74) *Attorney, Agent, or Firm* — Law Office of Sam Sokhansanj PLLC

(57) ABSTRACT

A method of extracting data from one or more data sources and loading the data into one or more destinations sources is disclosed. The method can include deploying data engines into one or more user network systems, receiving input with respect to a first data source, receiving input with respect to a second data destination, and receiving input with respect to one or more user-defined data stored on the first data source. The method can further include receiving input with respect to linking the first data source and second data destination to the deployed data engines and pinging, via data engines, for requests to extract and direct the user-defined data from the first data source, and retrieving, via the data engines, the user-defined data from the first data source and storing the retrieved user-defined within an intermediary database to be loaded it into the second data destination.

5 Claims, 36 Drawing Sheets

SERVER/CONTROL FILE

| Record_Type | Record_Key | Active | Description | Server_IP | Port | User_ID | Password | Attribute_1 |
|---|---|---|---|---|---|---|---|---|
| MFS | LINUX_MOUNT | X | LINUX Server Directory | localhost | | SDN3 | | \\96.11.92.225\SDNSA |
| MFS | SAP_APPSERVER1 | X | SAP Application Server Directory QA | localhost | | SDN1 | | C:\S |
| TFS | LINUX_MOUNT | X | LINUX Server Directory | localhost | | SDN3 | | /var/opt/SDNSAP |
| TFS | SAP_APPSERVER1 | X | SAP Application Server Directory QA | localhost | | SDN3 | | C:\S |
| TDB | SDN_MSSQL | X | SDN SQL Server DB | localhost | SDN2 | | ORACLE SDN | SDN |
| TDB | SDN_ORACLE | X | SDN Oracle DB | localhost | SDN2 | ORACLE | SDN | SDN |

(MFS, TFS, TDB labels on left)

FIG. 7A

INTEGRATION/CONTROL FILE

| DESTINATION | DEST_DESC | SAP_SID | MNT_FS_NAME | TGT_FS_NAME | DATABASE_NAME | XFR_METHOD |
|---|---|---|---|---|---|---|
| ORACLE_DB1 | SDN - Oracle DB | E09 | LINUX_MOUNT | LINUX_MOUNT | SDN_ORACLE | COPY |
| MSSQL_DB1 | SDN - SQLServer DB | E09 | SAP_APPSERVER1 | SAP_APPSERVER1 | SDN_MSSQL | COPY |
| LINUX_FS | SDN - Linux FileSystem | E09 | SAP_APPSERVER1 | LINUX_MOUNT | | FTPS |

FIG. 7B

INTEGRATION/SERVER CONTROL FILE (COMBINED)

| SDN_SAP_SERVER_DETAILS | | | | | | | |
|---|---|---|---|---|---|---|---|
| SAP Data Element | ZSDN1_CTL_REC_TYPE | ZSDN1_CTL_REC_KEY | ZSDN1_CTL_ACT_IND | ZSDN1_CTL_DESC | ZSDN1_CTL_IP | ZSDN1_CTL_PORT | ZSDN1_CTL_USERID |
| Data Type | CHAR(3) | CHAR(15) | CHAR(1) | CHAR(40) | CHAR(15) | CHAR(4) | CHAR(20) |
| Header | Record_Type | Record_Key | Active | Description | Server_IP | Port | User_ID |
| | MFS | LINUX_MOUNT | X | LINUX Server Directory | localhost | | |
| | MFS | SAP_APPSERVER1 | X | SAP Application Server Directory QA | 96.11.92.250 | | |
| | TFS | LINUX_MOUNT | X | LINUX Server Directory | localhost | | |
| | TFS | SAP_APPSERVER1 | X | SAP Application Server Directory QA | localhost | | |
| | TDB | SDN_MSSQL | X | SDN SQL Server DB | localhost | | |
| | TDB | SDN_ORACLE | X | SDN Oracle DB | localhost | | |

| SDN_SERVER_INT_POINTS | | | | | | |
|---|---|---|---|---|---|---|
| SAP Data Element | ZSDN1_DESTINATION | ZSDN1_DESTINATIONDESC | ZSDN1_MNT_FS_NAME | ZSDN1_TGT_FS_NAME | ZSDN1_TGT_DB_NAME | ZSDN1_DATA_XFR_METH |
| Data Type | CHAR(30) | CHAR(35) | CHAR(3) | CHAR(30) | CHAR(30) | CHAR(5) |
| Header | DESTINATION | DEST_DESC | SAP_SID | MNT_FS_NAME | TGT_FS_NAME | XFR_METHOD |
| | ORACLE_DB1 | SDN - Oracle DB | E09 | LINUX_MOUNT | LINUX_MOUNT | SDN_ORACLE | COPY |
| | MSSQL_DB1 | SDN - SQLServer DB | E09 | SAP_APPSERVER1 | LINUX_MOUNT | SDN_MSSQL | FTPS |
| | LINUX_FS | SDN - Linux FileSystem | E09 | SAP_APPSERVER1 | LINUX_MOUNT | | FTPS |

FIG. 7C

BULK UPDATE / SET CONFIGURATION
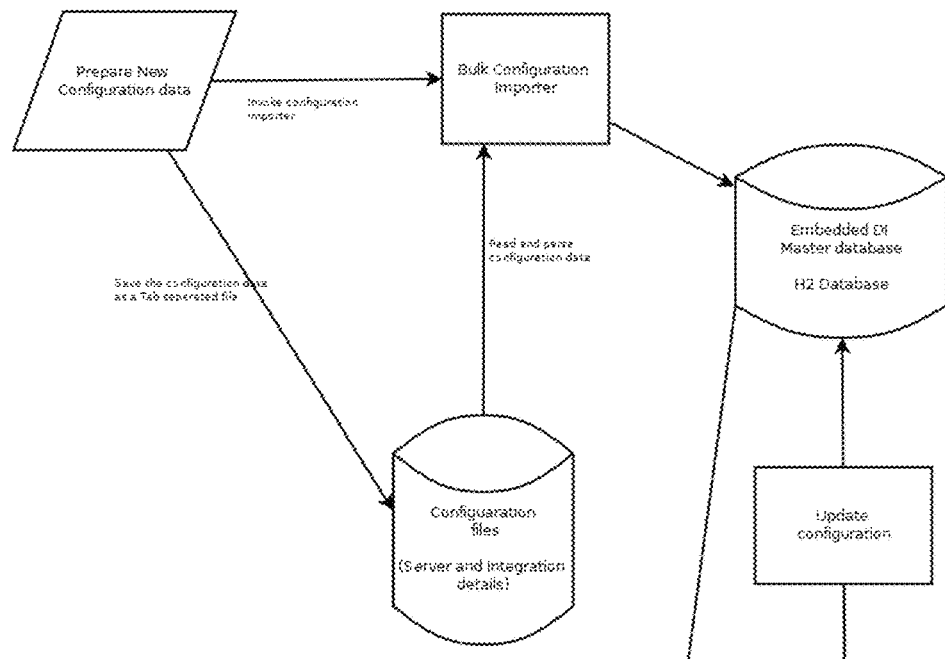
INTERACTIVE UPDATE / SET CONFIGURATION
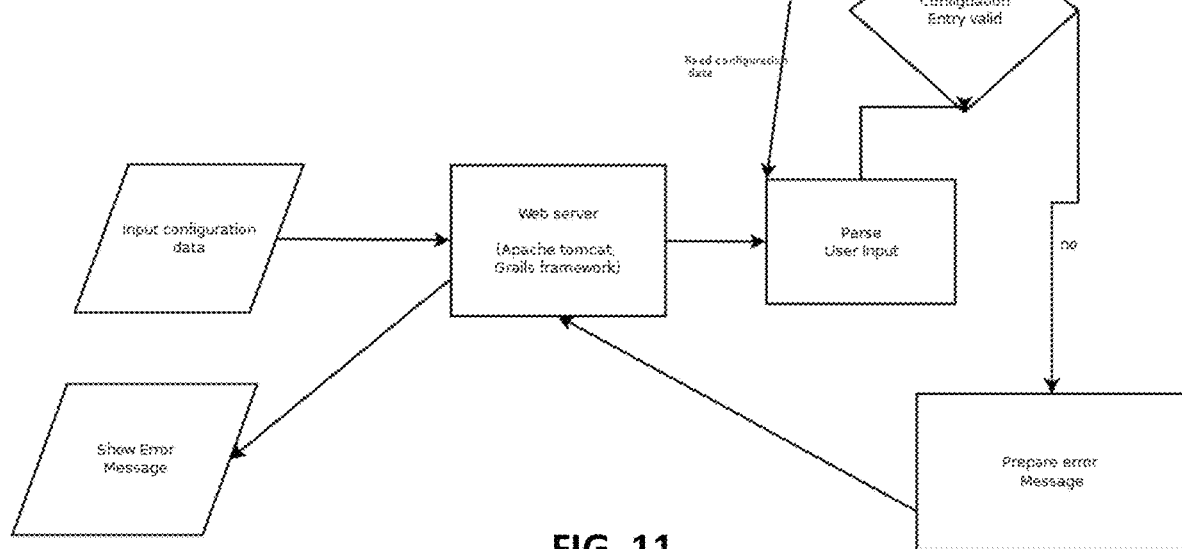
FIG. 11

| TEST: With datasource_id: | MySQL US DW | UK Sales DW Postgres | 09-Feb-2018 | 13-Apr-2021 | ⊕ active | Show Draft |
| --- | --- | --- | --- | --- | --- | --- |
| new 2 min | MySQL Source 1 -- E2E Testing | MySQL Source 1 -- E2E Testing | 21-Nov-2017 | 22-Nov-2018 | ⊕ active | |
| New Integration - 1 minute 3 tables | Test For Source $D | Test: Edited 51 | 21-Nov-2017 | 22-Nov-2019 | ⊕ active | |
| Every 3 min | Oracle UK DW | UK Sales DW Postgres | 10-Dec-2017 | 10-Dec-2018 | ⊕ active | |
| Every 4 min - Same Destination | UK Sales DW Postgres | UK Sales DW Postgres | 13-Dec-2017 | 13-Dec-2018 | ⊕ active | |
| s-3 | | | 22-Apr-2018 | 22-Apr-2018 | draft | |

DISTRIBUTED INTEGRATED PLATFORMS AS A SERVICE NETWORK

CROSS-REFERENCE TO RELATED APPLICATIONS

This application claims the benefit of U.S. Provisional Application No. 62/741,411 filed on Oct. 4, 2018, which is incorporated herein by reference in its entirety; and this application is a continuation-in-part (CIP) of U.S. Non Provisional application Ser. No. 15/959,202 filed on Apr. 21, 2018, which is incorporated herein by reference in its entirety, which is a continuation of U.S. Non-Provisional application Ser. No. 14/883,528 filed on Oct. 14, 2015 and issued as U.S. Pat. No. 9,953,070 on Apr. 24, 2018, which is incorporated herein by reference in its entirety, which claims the benefit of U.S. Provisional Application No. 62/143,138 filed on Apr. 5, 2015, which is incorporated herein by reference in its entirety.

BACKGROUND

This section is intended to introduce the reader to aspects of art that may be related to various aspects of the disclosure described herein, which are described and/or claimed below. This discussion is believed to be helpful in providing the reader with background information to facilitate a better understanding of the various aspects of the disclosure described herein. Accordingly, it should be understood that these statements are to be read in this light, and not as admissions of prior art.

An enterprise resource planning (ERP) system, such as an SAP system available from the German software corporation SAP® AG, incorporates various databases, servers, and computer-based systems in order to manage many internal and external aspects of an organization or company's enterprise level data management requirements in areas such as assets, financing, purchasing, sales, logistics, inventory, and human capital management, among others. Within the ERP system, there is typically an entire landscape of servers and systems ID's that allow for customization and the required testing before IT initiatives are implemented into a live environment.

Within any enterprise or company using these ERP systems, users from many areas of responsibility (i.e. finance, purchasing, sales, logistics, etc.) require prompt access to various types data that reside in the ERP system landscape. However, this data is not readily available in conventional systems or using convention software and methods, whether in raw form or formatted/organized form, through the standard system. Generally, there are limited options available for users to attempt to solve this problem. These options can include using SAP standard reporting platforms (SAP BI/BO/BW/BODS); extract, transform, and load (ETL) platforms provided by various vendors; Advanced Business Application Programming (ABAP) and SAP Query; and standard SAP export utilities (i.e. manual pulls) such as SQVI and table browsing (SE16, SE16N), among others. However, these options have more disadvantages than advantages. For example, they can be very expensive and hardware intensive, their development lifecycle is very time consuming and expensive, they can be resource intensive and highly specialized, and they typically are not flexible for end users to configure and enhance as them needed.

Hence, what is needed is a simple, cost-effective, quick, and end user customizable method and system for extracting and exporting data within an ERP system and other database systems to an end user that uses minimal software and hardware resources, does not require additional hardware, and does not require additional enterprise system development.

BRIEF SUMMARY

One or more aspects of the present disclosure described herein overcome the above shortfalls of prior attempted methods, devices, and systems. In particular, in one aspect of the disclosure described herein, an enterprise resource planning (ERP) system or SAP system data extraction, directing, and loading (EDL) method, system, application, and computer program is disclosed having a Data Export Workbench (DEW) and Data Integrator (DI) applications, is provided that is cost effective, includes an easy to use application set that extracts, directs and loads (EDL) any required data to predefined and controlled destinations that can be widely accessed by one or more users. Further, this EDL method and system allows enterprises and organizations to implement the disclosure described herein in existing, underutilized hardware and databases, and add more server capability or storage as needed.

More specifically, the EDL method and system takes advantage of underutilized hardware, reporting load spreads across the business teams, production data requirements can addressed within minutes or hours, instead of days, weeks or months, provides a reduction in IT requests while enhancing end user flexibility, allows for analysis against production (live) data from the outset, empowers the end user or business analyst to obtain the data the way they want it, provides flexibility to modify and enhance data outputs without IT development requests, provides an easy to use method of defining the data that is to be extracted and exported, and provides an easy to use method of directing the data to the proper ending destination, among other advantages.

In another aspect of the disclosure described herein, a method comprised of extracting data from an enterprise resource planning (ERP) system and directing the extracted to one or more end user destinations is provided. The method can include receiving mounted file system data, wherein the mounted file system data further identifies a mounted file system server and directory, receiving destination data, wherein the destination data is comprised of a target file server or a target database, and writing the mounted file system data and destination data to a control file. The method can further include receiving profile data, wherein the profile data references the destination data, wherein the profile data is further comprised of defined requested data and an authorization request, and wherein the requested data is comprised of one or more ERP data tables or ERP data fields. In addition, the method can include pinging the mounted file server directory in order to detect the received profile data, and in response to detecting the profile data, determining the destination data from the profile data. Further, the method can include authorizing the profile data in response to the authorization request, extracting the defined requested data from one or more ERP databases, transmitting or loading the extracted requested data to the target file server or target database identified in the destination data, and transmitting the extracted data from the target file server or target database to a user terminal.

The method can also include receiving a request for new profile data creation and receiving new ERP data tables or fields for the requested data, requesting authorization and activation of the received profile data from a system administrator. In addition, in response to authorization, the method can include activating the profile data. Here, the requested data can further include one or more ERP tables filters and net changes. In addition, the profile data can further include execution schedule data and priority data. Also, the profile data can be defined within a first portal operating on a first server, and the destination data can be defined within a second portal operating on a second server independent of the first server.

In another aspect of the disclosure described herein, a method of extracting data from one or more data sources and loading the data into one or more destinations sources is disclosed. The method comprises deploying one or more data engines into one or more user network systems, receiving input with respect to a first data source, receiving input with respect to a second data destination, and receiving input with respect to one or more user-defined data or metadata stored on the first data source. The method can further include receiving input with respect to linking the first data source and second data destination to one or more of the deployed data engines. In addition, the method can include pinging, via the one or more data engines, for requests to extract and direct the user defined data or metadata from the first data source, and retrieving, via the one or more data engines, the user-defined data or metadata from the first data source. In addition, the method can include storing the retrieved user-defined data or metadata within an intermediary database, and retrieving the stored user-defined data from the intermediary database and loading it into the second data destination. Here, the pinging can further include discovering requests, instructions, jobs, or schedules from a central server. The method can further include encrypting, via the one or more data engines, the user-defined data or metadata from the first data source. In addition, the user-defined data or metadata can be comprised of a table data and fields. The method can further include receiving priority and scheduling data with respect to the first data source or second data destination.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which:

FIG. 7A illustrates a table for one non-limiting embodiment of a sample server control file for the EDL method and system of the disclosure described herein, wherein sample data is shown for illustrative purposes.

FIG. 7B illustrates a table for one non-limiting embodiment of a sample integration control file for the EDL method and system of the disclosure described herein, wherein sample data is shown for illustrative purposes.

FIG. 7C illustrates a table for one non-limiting embodiment of a sample combined server and integration control file for the EDL method and system of the disclosure described herein, wherein sample data is shown for illustrative purposes.

FIG. 11 illustrates a block diagram for one non-limiting embodiment of a process flow chart for the DI application of the disclosure described herein, illustrating a bulk update/set configuration and interactive update/set configuration process flows.

Figure 21:
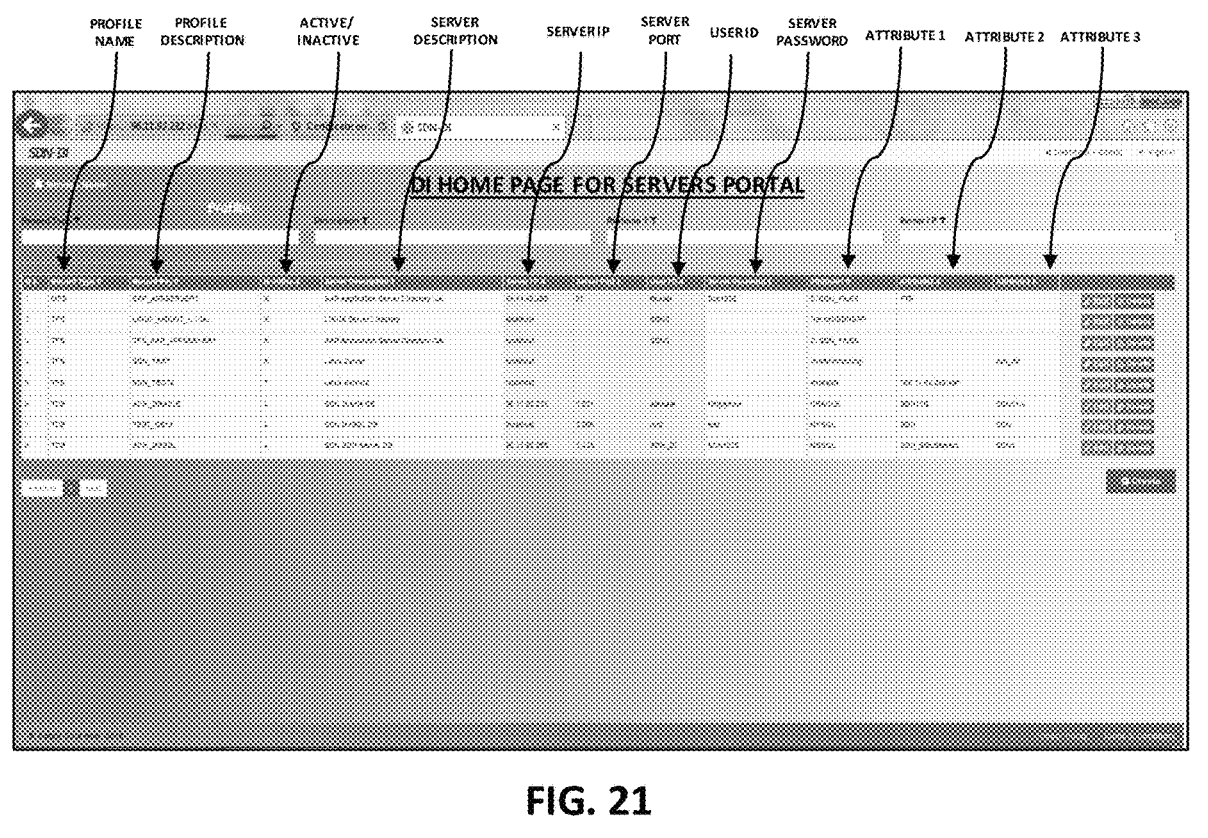

FIGS. 21-30 illustrate screenshot user interface displays for one or more embodiments of portals and user interfaces for the DI application of the disclosure described herein, wherein sample data is shown for illustrative purposes.

FIGS. 33-44 further illustrate various screenshots of one or more non-limiting exemplary embodiment portals for the SDN Control as disclosed herein.

DETAILED DESCRIPTION

Figure 1:
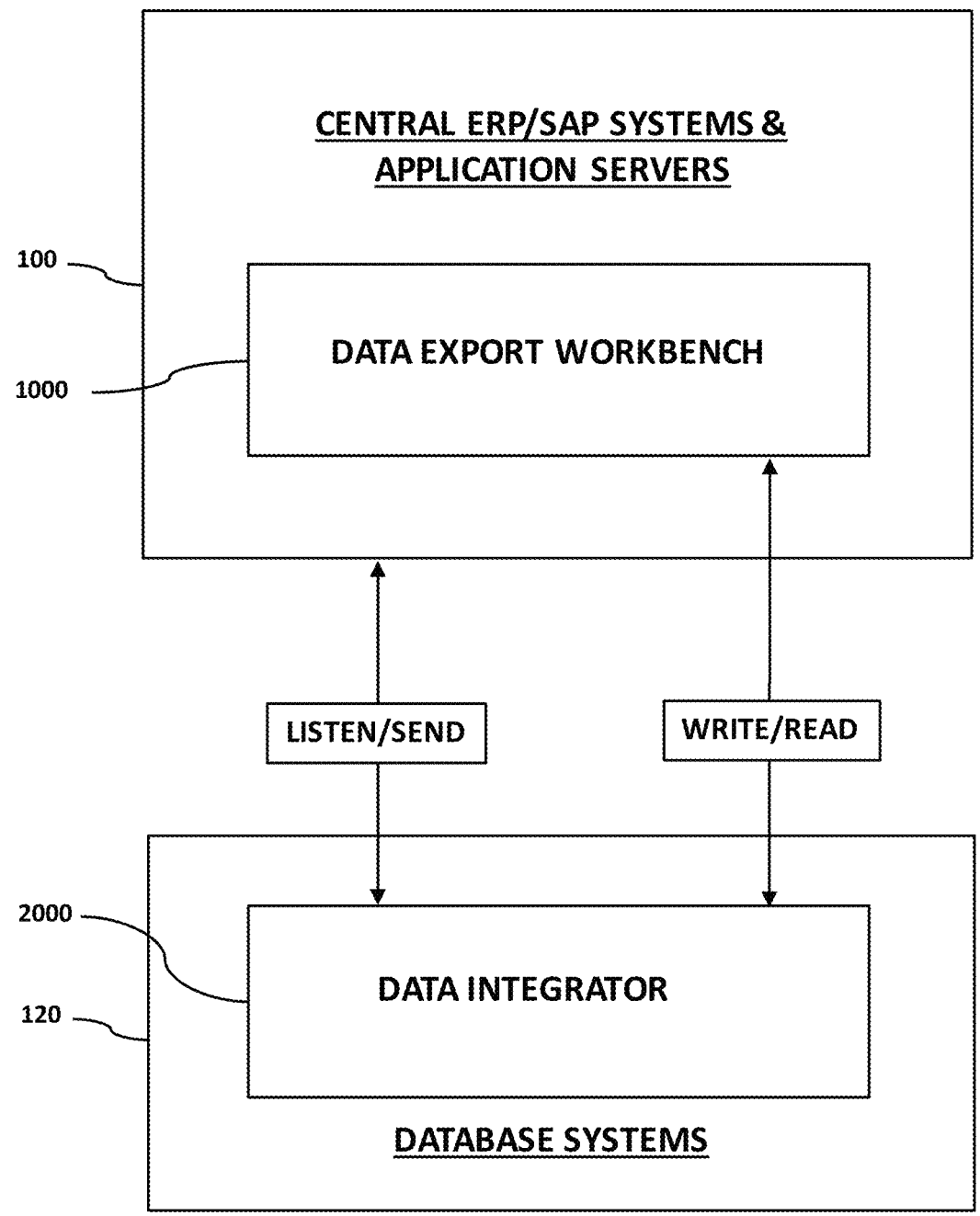
FIG. 1 illustrates a block diagram for one non-limiting embodiment of a general overview of the EDL system of the disclosure described herein, namely the Data Export Workbench (DEW) application in bi-directional communication with the Data Integrator (DI) application.

In the Brief Summary of the present disclosure above and in the Detailed Description of the disclosure described herein, and the claims below, and in the accompanying drawings, reference is made to particular features (including process and method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally. Further, it is contemplated within the scope of the disclosure described herein that certain processes, methods, and steps described herein may be performed in any order and may include all steps, some steps, or omit others.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

In one implementation of the disclosure described herein, a display page or screen may include information residing in a computing device's memory, which may be transmitted from the computing device over a network to a central center and vice versa. The information may be stored in memory at each of the computing device, a data storage resided at the edge of the network, or on the servers at the central center. A server, computing device, or mobile device may receive non-transitory computer readable media, which may contain instructions, logic, data, or code that may be stored in persistent or temporary memory of the mobile device, or may somehow affect or initiate action by a mobile device. Similarly, one or more servers may communicate with one or more mobile or computing devices across a network, and may transmit computer files residing in memory. The network, for example, can include the Internet, wireless communication network, or any other network for connecting one or more mobile or computing devices to one or more servers.

Any discussion of a server, computing, database, or mobile device or system may also apply to any type of networked device, including but not limited to devices or systems such as cellular phones (e.g., an iPhone®, Android®, Blackberry®, or any 'smart phone'), main frame, UNIX systems, Windows® Server systems, SAP® systems, IBM® systems, Oracle® systems, Sun® Microsystems, SQL databases, any database management system (DBMS), a personal computer, iPad®, server computer, or laptop computer; personal digital assistants (PDAs) such as a Palm-based device or Windows® CE device; a roaming device, such as a network-connected roaming device; a wireless device such as a wireless email device or other device capable of communicating wireless with a computer network; or any other type of network device that may communicate over a network and handle electronic transactions.

On a server, computing, or mobile device, the display page may be interpreted by software residing on a memory of the device, causing the computer file to be displayed on a video display in a manner perceivable by a user. The display pages described herein may be created using a software language known in the art such as, for example, the hypertext mark up language ("HTML"), the dynamic hypertext mark up language ("DHTML"), the extensible hypertext mark up language ("XHTML"), the extensible mark up language ("XML"), Java, C/C #/C++, Advanced Business Application Programming (ABAP), or another software language that may be used to create a computer file displayable on a video display in a manner perceivable by a user. Any computer readable media with logic, code, data, instructions, may be used to implement any software or process flow or steps or methodology. Where a network comprises the Internet, a display page may comprise a webpage of a type known in the art. Further, the computing device can operate with or work in conjunction with any content management software (CMS), DBMS, SAP system, or customer relations software (CRM) which can include but not limited to WordPress, any Java based software, Microsoft ASP.NET software, ABAP software, Perl based software, PHP based software, Python based software, Ruby on Rails based software, ColdFusion Markup Language (CFML), or other Software as a Service (SaaS) based software.

Phrases and terms similar to "software", "application", and "firmware" may include any non-transitory computer readable medium storing thereon a program or algorithm, which when executed by a computer, causes the computer to perform a method, process, or function.

Phrases and terms similar "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Phrases and terms similar to "portal" may include an intranet page, internet page, locally residing software or application, ABAP module, ERP or SAP portal/screen/page/module, or digital presentation for a user of the present disclosure described herein. The portal may also be any graphical user interface for accessing various modules, tables, data, features, options, and/or attributes of the present disclosure described herein. For example, the portal can be a web page accessed with a web browser, mobile device application, or any application or software residing on a computing device.

FIG. 1 illustrates one non-limiting embodiment of a block diagram for a general overview of the extraction, directing, and loading (EDL) method of system of the disclosure described herein for an ERP or SAP system, wherein the terms "ERP" and "SAP" (or variations thereof) may be used interchangeably within this disclosure. Here, the EDL method and system can include a Data Export Workbench (DEW) application 1000 in bi-directional communication with a Data Integrator (DI) application 2000. Here, the DI application may also be referred to herein as SDN-DI (or similar variations thereof), and DEW application may also be referred to herein as SDN-DEW (or similar variations thereof). More specifically, in one embodiment, the EDL method and system can include the DEW application 1000 that operates within an enterprises' central ERP or SAP environment/systems and application/central servers 100 that can read and write data to the DI application 2000 that operates within the enterprises' database systems 120. The DI application 2000 is configured in part to listen for data requests from the central/application servers 100 and from the DEW application 1000 and to export/send the requested data back to the central/application servers 100 and the DEW application 1000, among others. However, it is contemplated within the scope of the disclosure described herein that other methods and systems may also be used for the EDL system.

Figure 2:
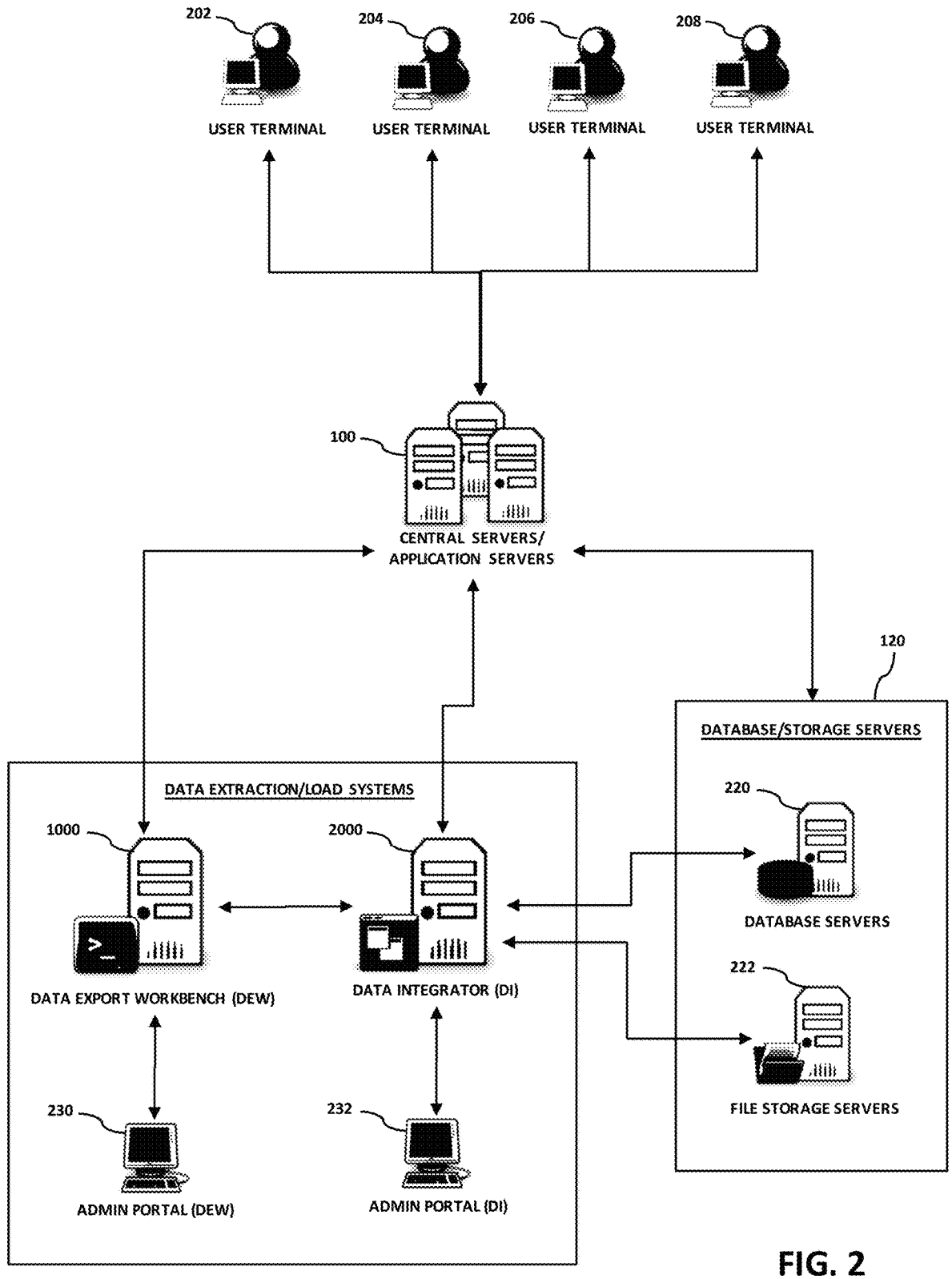
FIG. 2 illustrates a block diagram for one non-limiting embodiment of a general network architecture of the DEW and DI applications of the disclosure described herein within an ERP or SAP environment.

FIG. 2 illustrates one non-limiting embodiment of a general network architecture the DEW and DI applications within an ERP or SAP environment. More specifically, in one embodiment, one or more end-users from user terminals 202, 204, 206, and 208 within an enterprise can request data from or within the central enterprise SAP servers or application servers 100, wherein the DEW application 1000 operates, or is installed, or sits within the application server 100 environment and wherein the data can be requested through the DEW application. Here, the user terminals 202-208 can be various individual users or departments having various access privileges within an enterprise or organization requesting the data, or alternatively, administrators/users within the organization or outside the organization. Here, data requests are sent and processed at the DI application 2000, wherein the DI application 2000 operates, is installed, or sits within the database environment 120, wherein the data is extracted, directed, loaded, and exported to one or more end user's at any one or more user terminal's 202-208, via the application server 100 and DEW application 1000. More specifically, DI application 2000 can communicate bi-directionally with one or more database servers 220 and file storage servers 222. In addition, one or more administrators' portals or terminals 230 and 232 may communicate, control, manage, or operate the DEW application 1000 and DI application 2000, respectively. However, it is contemplated within the scope of the disclosure described herein that other methods and systems may also be used for the EDL system.

Figure 3:
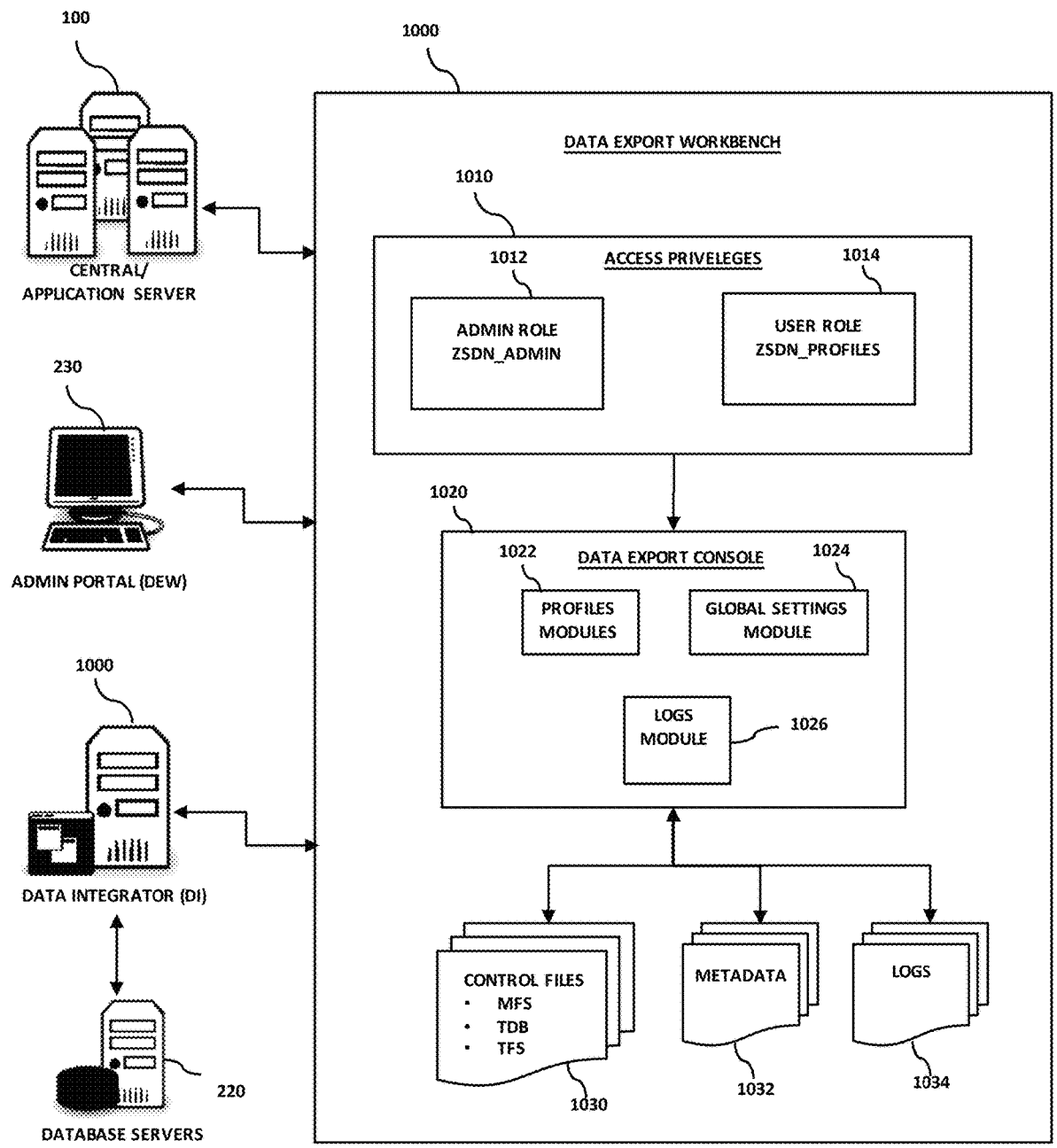
FIG. 3 illustrates a block diagram for one non-limiting embodiment of a general overview of the DEW application and its components of the disclosure described herein.
Figures 6A, 6B, 6C:
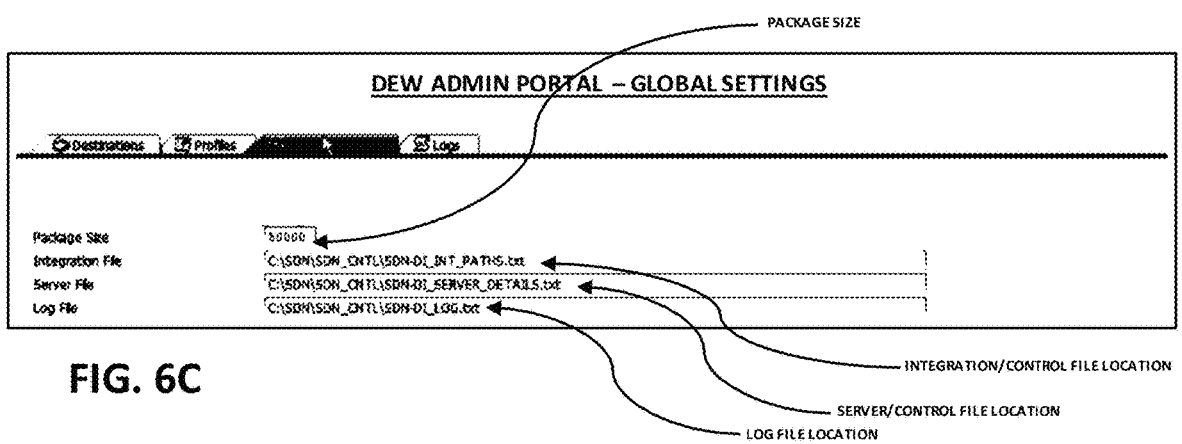
FIG. 6A illustrates a display screen interface for one non-limiting embodiment of an ERP or SAP portal of the disclosure described herein for an administrator illustrating a destinations tab or module of the DEW application of the disclosure described herein, wherein sample data is shown for illustrative purposes.
FIG. 6B illustrates a display screen interface for one non-limiting embodiment of an ERP or SAP portal for an administrator illustrating a profiles tab or module of the DEW application of the disclosure described herein, wherein sample data is shown for illustrative purposes.
FIG. 6C illustrates a display screen interface for one non-limiting embodiment of an ERP or SAP portal for an administrator illustrating a global settings tab or module of the DEW application of the disclosure described herein, wherein sample data is shown for illustrative purposes.

FIG. 3 illustrates one non-limiting embodiment of a block diagram for a general overview of the DEW application and its components. More specifically, in one embodiment, the DEW application 1000 can include administrator role privileges (ZSDN_ADMIN) 1012 and user role privileges (ZSDN_PROFILES) 1014. The DEW application 1000 further includes a portal or console 1020 having a profiles module 1022, global settings module 1024, and logs module 1034, which are also shown in FIGS. 6A-6C. In addition, the DEW application may also have a destinations module, also shown in FIG. 6A. In addition, the DEW application can read, write, and load control files data 1030 (MFS, TDB, TFS), various types of metadata 1032, and log data 1034. It is contemplated within the scope of the disclosure described herein that other methods and systems may also be used for the EDL method and system.

Figure 4:
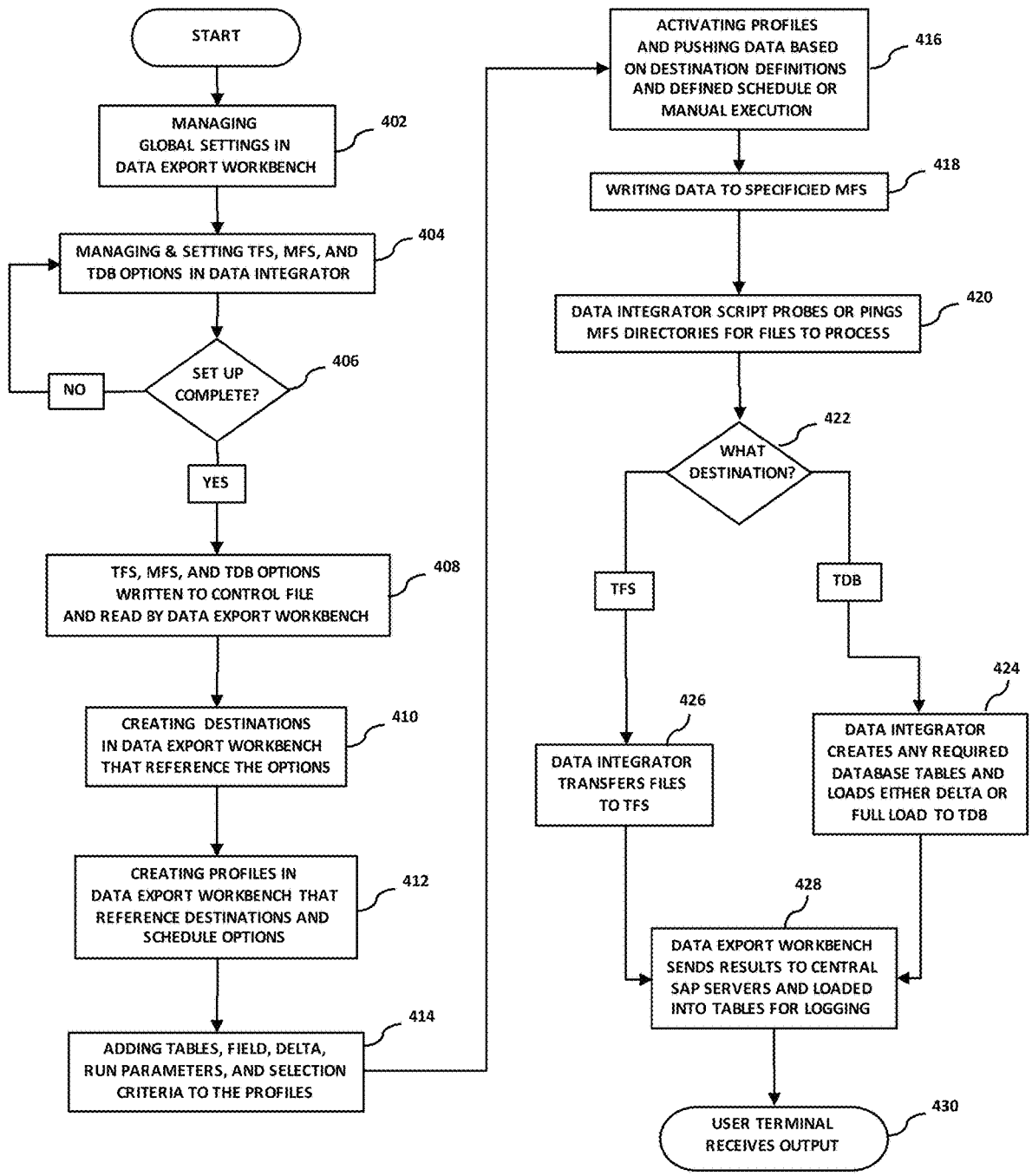
FIG. 4 illustrates a block diagram for one non-limiting embodiment of a process flow chart for the DEW and DI applications of the disclosure described herein.

FIG. 4 illustrates one non-limiting embodiment of a block diagram process flow chart for the DEW and DI applications. Here, the process can be performed by either an administrator or user, or in combination, and alternatively, the process may be performed automatically or semi-automatically (with either admin or user input) by the EDL method, system, and application. In particular, in one embodiment, the process can start at step 402, wherein various global settings for the DEW application 1000 can be defined, pre-defined, or set. Next, at step 404, the process can include managing, defining, or setting a target file database (TFS), mounting file database (MFS), and target database (TDB) options and settings within the DI application 2000. At step 406, the process can include determining of the set-up, defining, or managing of the prior step 404 is complete. If not complete, then the process can go back to step 404. If complete, then the process can proceed to step 408. At step 408, the process can include writing to a control file the defined, determined, or set TFS, MFS, and TDB options from steps 402 and 404. Here, one or more embodiments for an exemplary control file are shown with respect to FIGS. 7A-7C. At step 410, the process can further include creating destinations within the DEW application 1000 that reference the TFS, MFS, and TDB options, which can also be performed at step 404.

Still referring to FIG. 4, at step 414, the process can include adding tables field, delta, run parameters, and selection criteria to the created profiles from step 412. Next, at step 416, the process can include activating profiles and pushing data based on defined destination definitions and schedule for manual execution. At step 418, the process can include writing data to a specified MFS. At step 416, the DI 2000 script can probe, ping, seek, or detect one or more MFS directories to process files. At step 422, the process can determine if the destinations are TDB or TFS. If the destinations are TDB, then the process can proceed to step 424, wherein the DI application 2000 creates any required database tables and can load export either delta or full load to one or more TDB's. Alternatively, if the destination is TFS, then the DI application 2000 can transfer or transmit files to one or more TFS's. After either of steps 426 or 424, the process can proceed to step 428, wherein the DEW application 1000 can send the results or the extracted data, files, tables, delta, or full loads to central servers 100 and load the data into one or more tables for logging, viewing, or retrieving. At step 430, the process can receive, retrieve, and view the requested, extracted, and outputted data. It is contemplated within the scope of the disclosure described herein that other methods and systems may also be used for the EDL method and system either in combination or in lieu of the one or more steps illustrated within FIG. 4.

Figure 5:
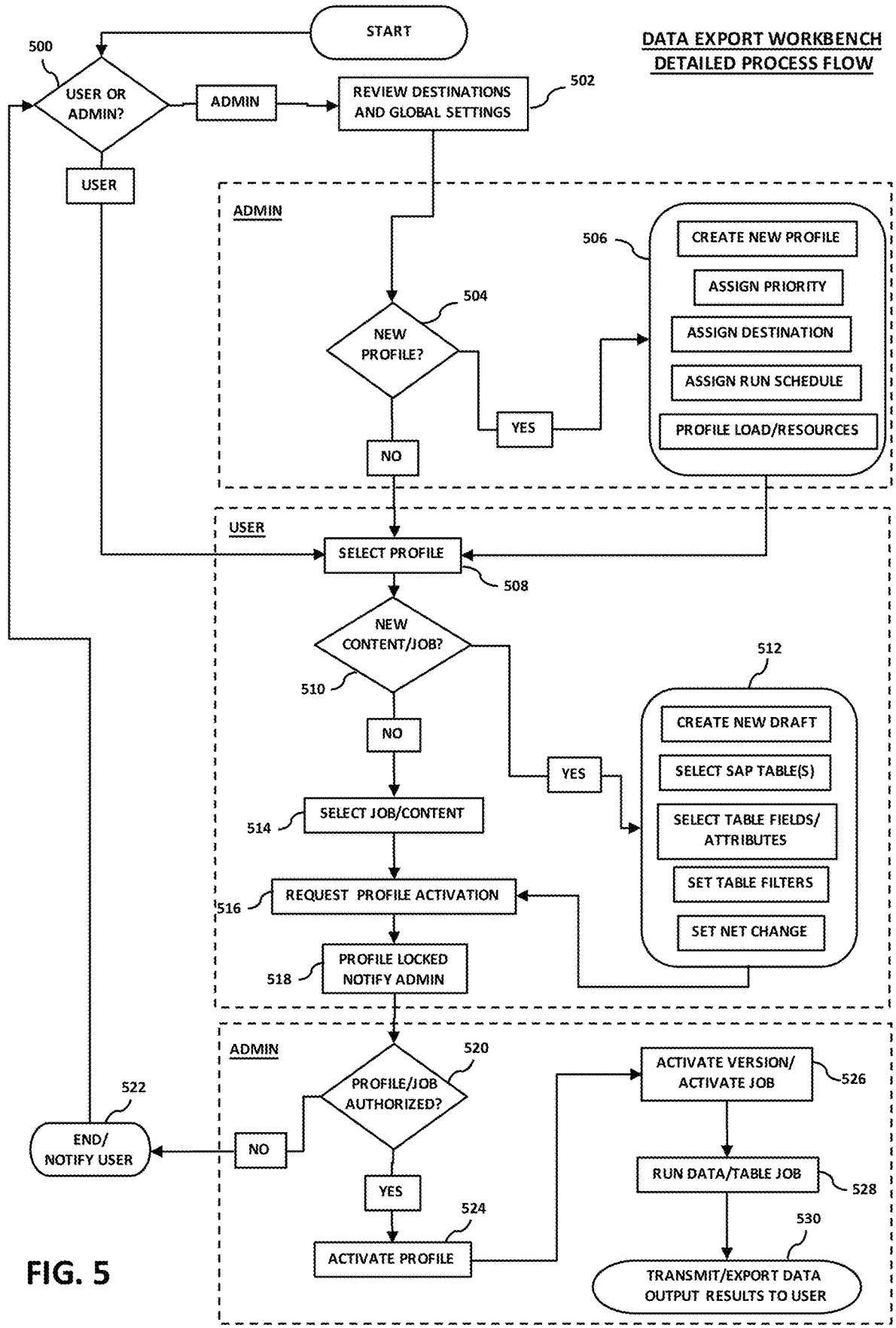
FIG. 5 illustrates a block diagram for one non-limiting embodiment of a more detailed process flow chart for the DEW application of the disclosure described herein.

FIG. 5 illustrates one non-limiting embodiment of a more detailed block diagram process flow chart for the DEW application 1000. Here, the process can be performed by either an administrator or user, or in combination, and alternatively, the process may be performed automatically or semi-automatically (with either admin or user input) by the EDL method, system, and application. In particular, in one embodiment, the process can start by determining if a user or administrator is logged in, accessing, managing, or operating with the SAP environment or DEW application. If an admin (or alternatively a user) is logged in, then at step 502, then the admin can review or manage destinations and global settings. Further, at step 504, if new profile is being created, then process can proceed to a profiles module at step 506. Here, within the profiles module, an admin or user can create new profile, assign priorities to the profile or job, assign or define one or more destinations, assign or define one or more run schedules for the profile or job, and change or edit profile load and system resources. Next, at step 506, the user (or alternatively the admin) can select one or more previously created profiles. At step 510, the process can determine if the defined content or job within the profile is new or previously created. If new content/job, then at step 512, the process can create a new draft for the content/job, select one or more SAP related tables, fields, or pre-defined SAP data, select or define table attributes and properties, define or set table filters, and define or set net changes or delta runs. More specifically, In SDN-DEW, for each profile, the content of tables, fields, delta indicators and filters are arranged into a "draft". When an admin reviews the draft and approves it, the draft is deleted and the new content is posted to the live profile. A user, without impacting the live profile can then create a new draft, wherein they can modify the content. The live content can stay in place until the new draft is approved. Further, the admin can also reject the draft and the user may at any time delete the draft. This function allows for profile content to be managed in a controlled manner and deployed based on approvals. At any point in time, there is either 0 (zero) or 1 (one) draft for any given profile.

Still referring to FIG. 5, if at step 510, the content or job is not new, then at step 514 the user can select the job or content to be processed. After the job or content is created and selected at either of steps 512 and 514, then the process can then proceed to step 516. At step 516, the process can request or send a profile (or job/content) activation request to an admin. Once the request has been sent, then at step 518, the process can notify one or more admins of the pending request. In addition, at step 518, the process can lock the profile from further changes or editing. Next, at step 520 the process or admin can determine if the profile or job is authorized or approved. More specifically, when a user adds content to a profile, a systematic approval must be processed by an admin who is defined by the client. This ensures that no data is published without consent of a client sponsored admin, If the profile or job is not authorized by the process or authenticated by the admin, then the process can notify the user at step 522 and proceed back to step 502. If the job is authorized or authenticated by the admin, then the process can activate the profile at step 524. Next, at step 526, the process can then activate a version and job. Further, at step 528, the process can then run the job, draft, or profile. This can include extracting, retrieving, and parsing the requested data using the DEW application processes, among other processes. At step 530, the process can send, transmit, export, and output the requested data, pre-defined data, SAP data, SAP tables, SAP fields, attributes, delta, and net change to one or more users and user destinations. More specifically, at step 530, the DEW application can export the data to the MFS, wherein the data is then picked up by the DI application. Further, once the DI application loads the data, it is accessible to the end user. It is contemplated within the scope of the disclosure described herein that other methods and systems may also be used for the EDL method and system either in combination or in lieu of the one or more steps illustrated within FIG. 5.

FIG. 6A illustrates one non-limiting embodiment of an SAP portal for an administrator illustrating a destinations tab or module of the DEW application having sample data therein for illustrative purposes. More specifically, the destinations module, portal, or tab can include but is not limited to the following attributes and table fields: a destination name column defining one or more names for the destinations such as databases, file servers, among others; a destination description column defining or describing the type of destination, such as an Oracle®, SQL server database, or Linux file system, among others; an SAP SID column can define the SAP SID (i.e. a unique ID character name identifying each SAP instance such as DEV, QA, PROD, among others) or unique identification; an MFS column for defining the name of the mounting file system or server; a TFS column for defining the name of the target file system or server; a TDB column for defining the name of the target database; a file transfer method column for defining the file transfer method or protocols such as copy, FTP, and FTPS, among others; a record type column for defining the record type, such as MFS, TFS, among others; a record key column identifying the record key such as the mounting file system, databases, or application servers; an active or inactive status column indicating whether a profile, content, draft, or job have been activated or not; and a directory description column defining a description for the type of directory, such as a Linux or SAP server directory, among others. It is contemplated within the scope of the disclosure described herein that other portals, modules, columns, fields, and tabs may also be used for the EDL system either in combination or in lieu of the display illustrated within FIG. 6A. It is contemplated within the scope of the invention that in other embodiments, the Destination tab of FIG. 6A may only include one or more of the aforementioned attributes, tables, or field. Alternatively, the destinations tab may not include any of the aforementioned attributes, tables, or fields. Further, the one or more attributes, fields, or columns of destinations tab module of FIG. 6A may also be incorporated into the DI application. For example, one or more of the destinations tab data can be transmitted from the DI application and displayed as informational data to a user or admin. In such an embodiment, all destinations information is exclusively maintained by the DI application where it can also be presented at a portal.

FIG. 6B illustrates one non-limiting embodiment of an SAP portal for an administrator illustrating a profiles tab or module of the DEW application having sample data therein for illustrative purposes. More specifically, the profiles module, portal, or tab can include but is not limited to the following attributes and table fields: a profile name column defining or identifying a name for a user or admin created profile; a description column defining or identifying a description for the profile name; an active or inactive status indicating column for the profiles; an active or inactive version indicating column for the draft versions; the draft version identifying column, such as a "W" or any other word, letter, number, or symbol indicating a new, active, or modified draft version; the draft status column; a destination column defining or identifying one or more destinations for the profile, draft, schedule, content, or job; a table name column; a delimiter type column; a quote column; a priority identifying or indicating status column; a job count indicating column; a user or admin author name identifying column; a created date column; changed by name identifying column; and a modified or changed date column. It is contemplated within the scope of the disclosure described herein that other portals, modules, and tabs may also be used for the EDL method and system either in combination or in lieu of the display illustrated within FIG. 6B.

FIG. 6C illustrates one non-limiting embodiment of an SAP portal for an administrator illustrating a global settings tab or module of the DEW application having sample data therein for illustrative purposes. More specifically, the profiles module, portal, or tab can include but is not limited to the following attributes and table fields: a package size field identifying the size of the requested package, data, file, tables, etc.; one or more locations for an integration file; one or more locations for a server file; and one or more locations for a log file. It is contemplated within the scope of the disclosure described herein that other portals, modules, and tabs may also be used for the EDL method and system either in combination or in lieu of the display illustrated within FIG. 6C.

FIG. 7A illustrates one non-limiting embodiment of a sample server control file for the EDL method and system having sample data therein for illustrative purposes. More specifically, the server control file can include but is not limited to: the type of record (MFS, TFS, TDB); name for the record type; record key; a description for the record type; the IP location for the server; port identification data; user identification and password data; and various other related attributes. It is contemplated within the scope of the disclosure described herein that other types of control files or data may also be used for the EDL method and system either in combination or in lieu of the data illustrated within FIG. 7A.

FIG. 7B illustrates one non-limiting embodiment of a sample integration control file for the EDL system having sample data therein for illustrative purposes. More specifically, the integration control file can include but is not limited to: one or more destination identification and names; a destination description; SAP SID data; MFS, TFS, or TDB names and identification; and file or data transfer methods. It is contemplated within the scope of the disclosure described herein that other types of control files or data may also be used for the EDL method and system either in combination or in lieu of the data illustrated within FIG. 7B.

FIG. 7C illustrates one non-limiting embodiment of a sample combined server and integration control file having sample data therein for illustrative purposes. It is contemplated within the scope of the disclosure described herein that other types of control files or data may also be used for the EDL method and system either in combination or in lieu of the data illustrated within FIG. 7C.

Figure 8:
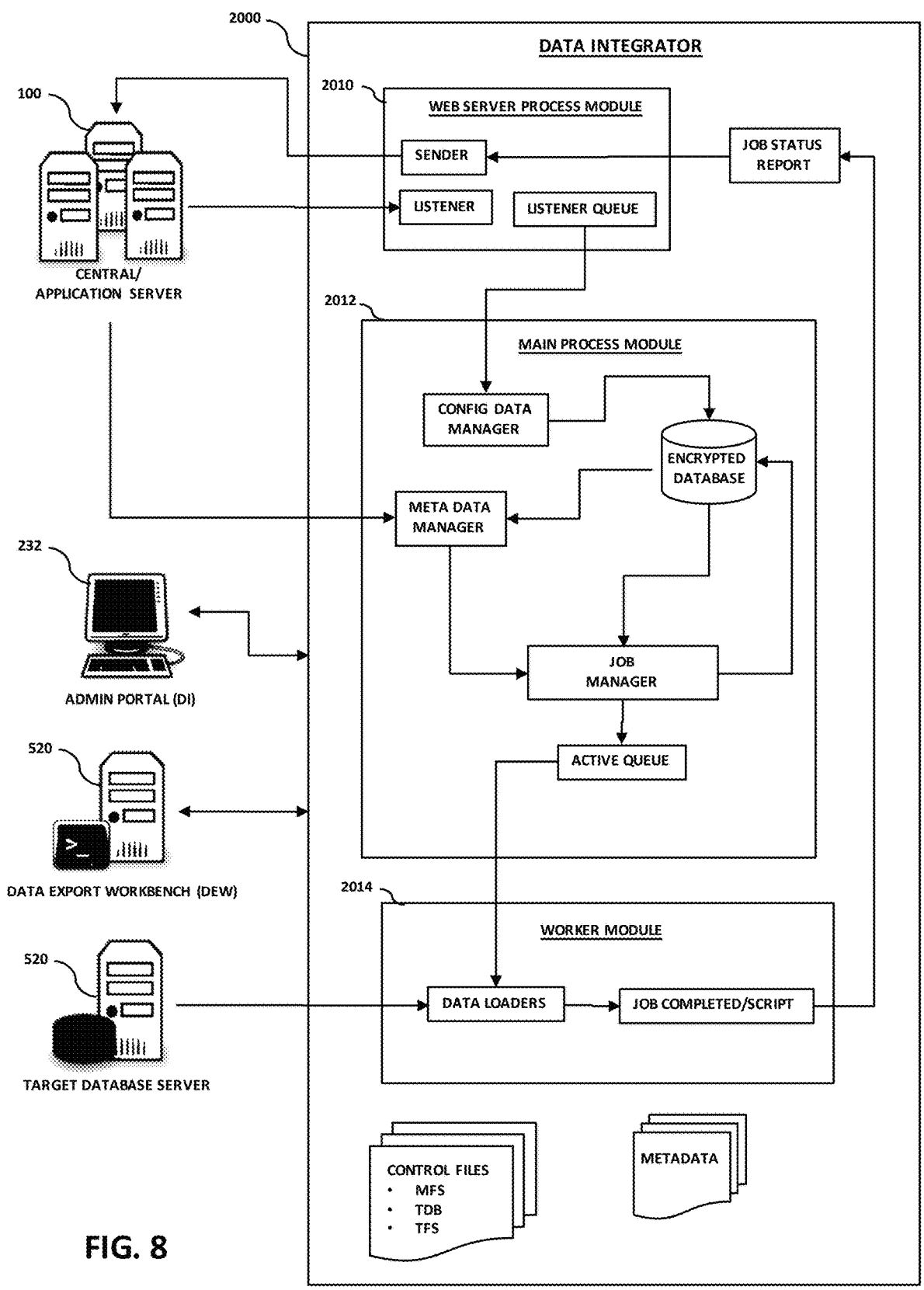
FIG. 8 illustrates a block diagram for one non-limiting embodiment of a general overview of the DI application and process of the disclosure described herein.

FIG. 8 illustrates one non-limiting embodiment of a block diagram for a general overview of the DI application and process. Here, the DI application, system, or server 2000 can include a web server module 2010 that can further include a sender sub-module for sending job status report data to central servers 100; a listener sub-module for listening or detecting data or job requests from the central servers, and alternatively, the listener sub-module can ping the central servers 100 for new data requests; and a listener queue sub-module for transmitting the received or requested data to a main process module 2012. Here, the main process module 2012 can further include a configuration data manager sub-module for transmitting received data from the listener queue to one or more encrypted databases. In addition, within the main process module 2012, a meta data manger sub-module can also receive meta data from the encrypted database and also receive meta data from the central servers 100. Further, a job, draft, profile, content, or run manager can both receive data from the encrypted database and the meta data manger and transmit the either the received meta data or other data back to the encrypted database. The job manager can then place the received data in an active queue for transmitting to the worker module 2014 for processing, running, loading, and extracting, among others. The worker module 2014 can further include a data loaders sub-module and a job completed script or algorithm sub-module. Here, the worker module 2030 operates to run, extracted, and load the requested user or admin data (i.e. profile, draft, content, job, table, SAP data, fields, attributes, delta, among others) from either the central servers 100 or the DEW application 1000. Here, the DI application, system, and server can further read, write, and store the server and integration control files, such as MFS, TFS, and TDB data, and further read, write, and store various types of meta data, among others. It is contemplated within the scope of the disclosure described herein that other methods and systems may also be used for the EDL method and system either in combination or in lieu of the one or more systems illustrated within FIG. 8.

Figure 9:
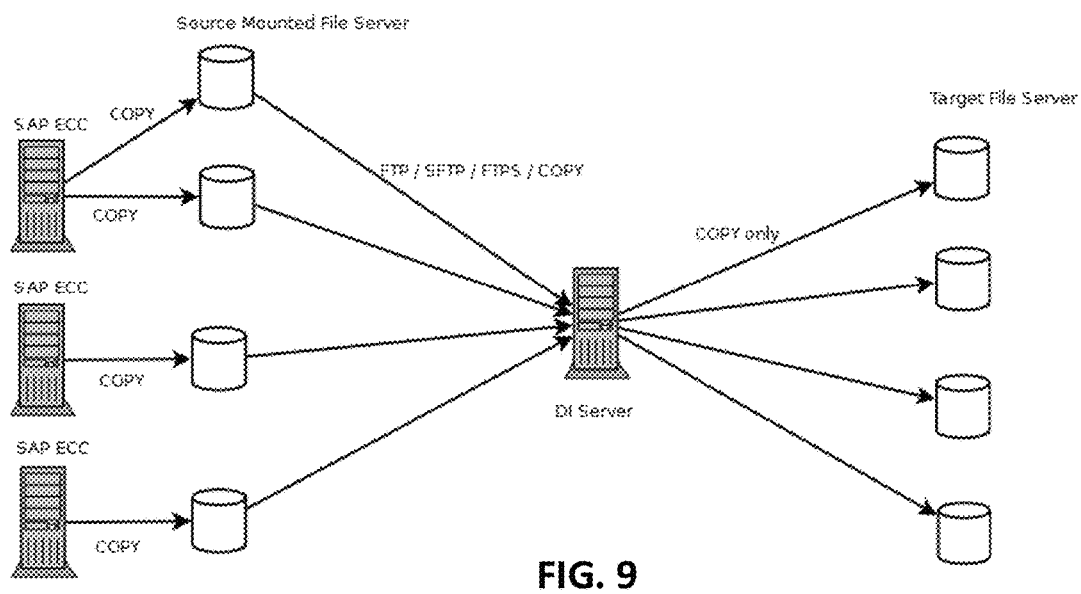
FIG. 9 illustrates a block diagram for one non-limiting embodiment of a general overview network system for the DI application, illustrating data movement between a mounted file system (MFS) and target file system (TFS).

FIG. 9 illustrates one non-limiting embodiment of a general overview network diagram for the DI application, illustrating data movement between a mounted file system (MFS) and target file system (TFS). It is contemplated within the scope of the disclosure described herein that other methods and systems may also be used for the EDL method and system either in combination or in lieu of the one or more systems illustrated within FIG. 9.

Figure 10:
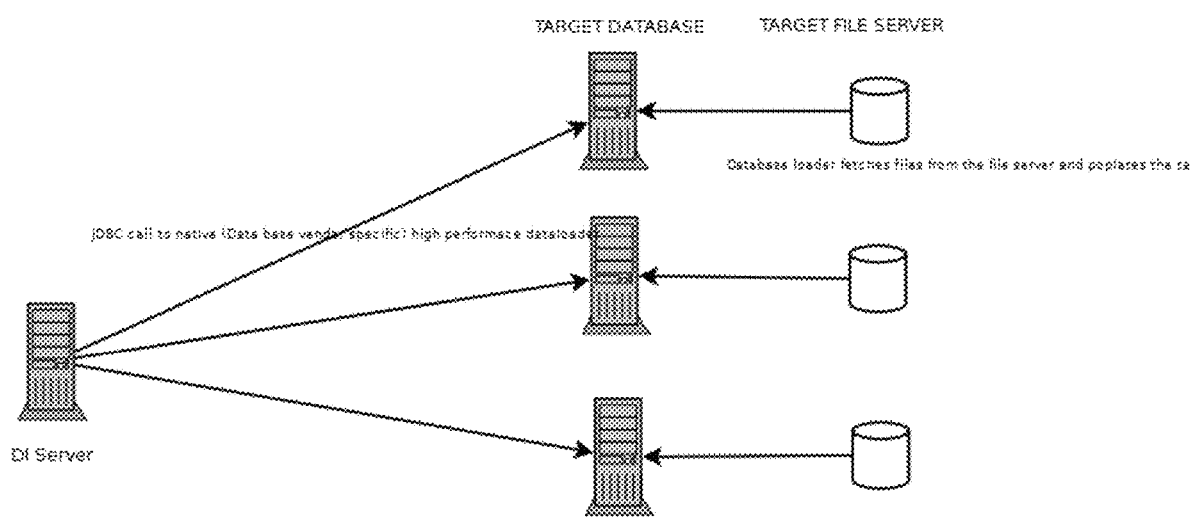
FIG. 10 illustrates a block diagram for one non-limiting embodiment of a general overview network system for the DI application of the disclosure described herein, illustrating data movement between the TFS and a target database system (TDB).

FIG. 10 illustrates one non-limiting embodiment of a general overview network diagram for the DI application, illustrating data movement between the TFS and a target database system (TDB). It is contemplated within the scope of the disclosure described herein that other methods and systems may also be used for the EDL method and system either in combination or in lieu of the one or more systems illustrated within FIG. 10.

FIG. 11 illustrates one non-limiting embodiment of a block diagram process flow chart for the DI application, illustrating a bulk update/set configuration and interactive update/set configuration process flows. More specifically, in one embodiment, the process can include preparing new configuration data (Prepare New Configuration data, FIG. 11). Here, the new configuration data can be saved in a configuration file. Here, the configuration file can be the server and integration control file. More specifically, there can be two copies of the configuration file, one on the DI application or server and another file that is by the DI application (without passwords) to the MFS that is read and displayed by the destinations tab, wherein the destinations tab can be viewed at the DEW application portal or at the DI application portal. Here, the saved configuration data can then be sent or loaded into a bulk configuration importer module (Bulk Configuration Importer, FIG. 11). In addition, the new configuration data can also invoke or trigger the configuration importer and transmitting the data to the bulk configuration importer. The bulk configuration importer can then transmit the received data to an embedded master database (Embedded DI Master database/H2 Database, FIG. 11), wherein the embedded database can also receive updated configuration data. Here, the master database can further transmit the configuration data to a user input module or other server. In an additional aspect of the process, an input configuration data module can receive configuration data and further transmit the data to a web server. If there is an error with the configuration data, the web server can transmit an error notification. Here, the input configuration data can further be parsed (Parse User Input, FIG. 11) to determine if the configuration data is valid and transmit the configuration data or updated configuration to data master database. Further, if the configuration data is invalid or there is an error (Configuration Entry valid, FIG. 11), then an error message can be prepared (Prepare error Message, FIG. 11) and notification can be transmitted to a web server (Web server, FIG. 11), wherein the web server (Web server, FIG. 11) is configured to further receive input configuration data (Input configuration data). It is contemplated within the scope of the disclosure described herein that other methods and systems may also be used for the EDL method and system either in combination or in lieu of the one or more steps illustrated within FIG. 11.

Figure 12:
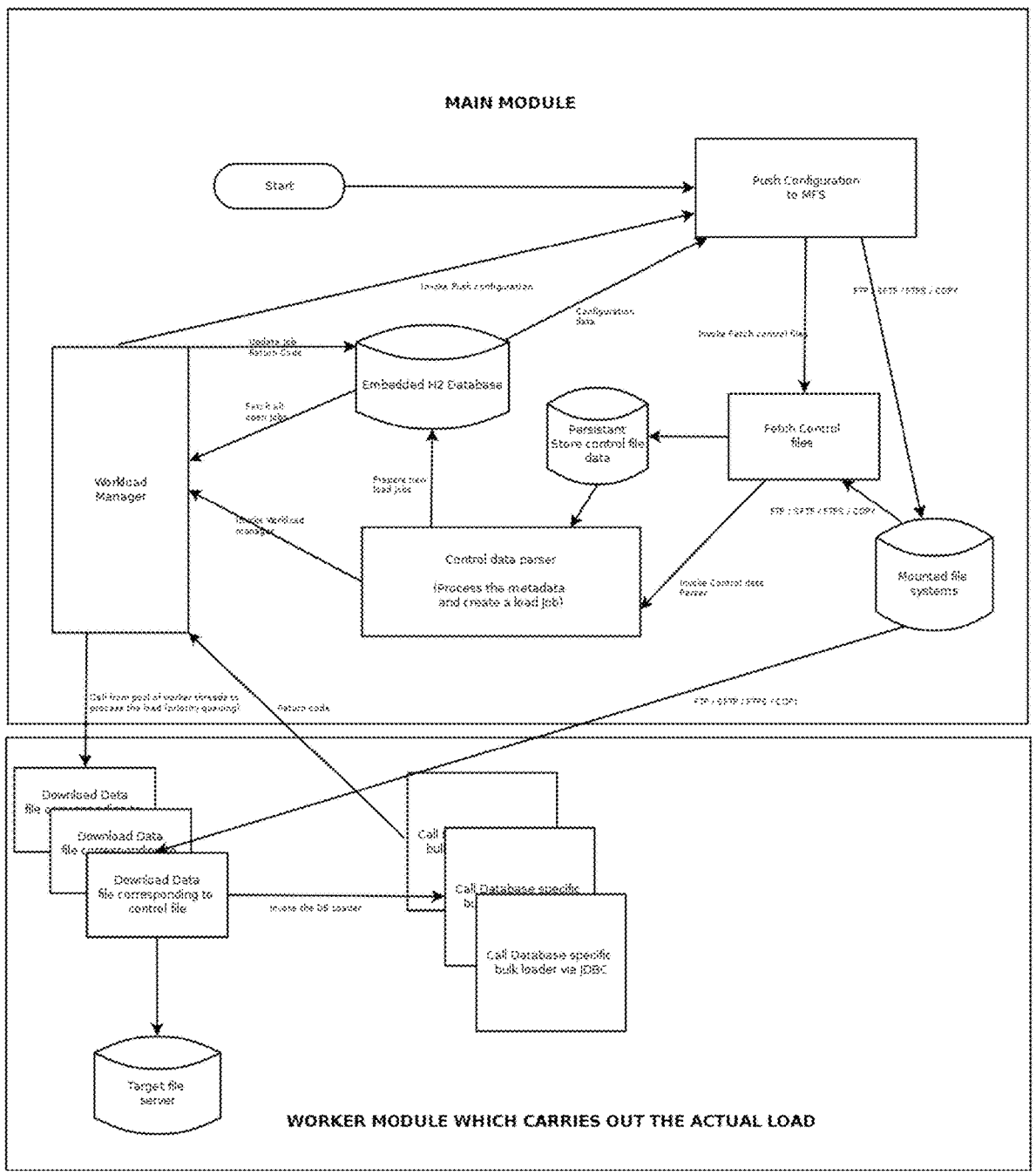
FIG. 12 illustrates a block diagram for one non-limiting embodiment of a detailed process flow chart for the DI application of the disclosure described herein, illustrating main module and worker module process flows.

FIG. 12 illustrates another non-limiting embodiment of a detailed block diagram process flow chart for the DI application, illustrating a main module (MAIN MODULE, FIG. 12) and worker module process flows (WORKER MODULE, FIG. 12). More specifically, in another embodiment, the DI application, system, or server 2000 can include a main module having a workload manager sub-module (Workload Manager, FIG. 11) for invoking or pushing configuration data to a push configuration to MFS sub-module (Push Configuration to MFS, FIG. 11). Here, the workload manager sub-module can further transmit, update job, or return code data to the embedded master database (Embedded HD Database, FIG. 12) and further retrieve and fetch all open, active, or pending jobs from the embedded master database. Here, a control data parser sub-module (Control data parser, FIG. 12) can process metadata and create a load job, such as preparing new job loads, and send this to the embedded master database. In addition, the control data parser sub-module can further invoke or trigger the workload manager sub-module. Still referring to FIG. 12, a fetch control files sub-module (Fetch control files, FIG. 12) can further fetch or retrieve the control files from the either the embedded master database or the push configuration to MFS sub-module (Push Configuration to MFS, FIG. 12). Here, the push to configuration to MFS sub-module can transmit or transfer the MFS or configuration data to one or more mounted file systems, wherein the mounted file systems can further transmit the MFS or configuration data via FTP, FTPS, SFTP, or copy to a worker module, wherein the data is downloaded into a corresponding control file. Still referring to FIG. 12, the worker module can receive the configuration data and place, load, or export the data into one or more control files, wherein the control files identifies a TFS or is then transmitted to a TFS. In addition, worker module can further invoke or trigger a database loader sub-module and call specific bulk loaders via JDBC. It is contemplated within the scope of the disclosure described herein that other methods and systems may also be used for the EDL method and system either in combination or in lieu of the one or more steps illustrated within FIG. 12.

In another aspect of the disclosure described herein, an SDN-DI or DI application is disclosed, wherein the SDN-DI is a program that is loaded and configured on target destination servers that probe a Mounted File Server (MFS) directories looking for data to move to the destination specified in the control file. It also returns results of the run to the various source SAP systems. Here, SDN-DI can be configured through a local browser based application. Further, an SDN-DEW or DEW application is disclosed, wherein the SDN-DEW is a series of programs that are loaded into a client's SAP system(s). Further, it provides administrative and content user screens that allow for tailored data and controlled information to be extracted from any SAP system and written to an MFS.

Further, one embodiment for the implementation method or process of SDN-DEW and SDN-DI can include but is not limited to a (1) preparation, (2) configuration of SDN-DI, (3) configuration of SDN-DEW, (4) testing development system, (5) testing QA and pre-production systems, and (6) final deployment.

More specifically, the (1) preparation step can include but is not limited to: receiving software packages such as SDN-DI and SDN-DEW, and loading the software packages which can include importing SDN-DEW to a SAP development environment and running a SDN-DI installation executable set-up wizard on one or more destination database servers. The (2) configuration of SDN-DI and configuration portal step can include but is not limited to: establishing and configuring SAP environments such as system ID's (SID) and application servers; establishing, determining, configuring, or creating Mounted File Systems (MFS) and Target File Systems (TFS); establishing, determining, configuring, or creating one or more database environments such as Target Database (TDB) details; and creating a configuration file the configuration file to a control file directory. The (3) configuration of SDN-DEW can include an admin workbench portal or processes for reading the configuration file and view destination options and review log activity; and a profiles workbench or processes or creating draft content of tables, fields, filters, and net changes, among others, and submitting a final version for approval.

Further, the (4) testing development system step can include but is not limited to: unit testing, an issue resolution process, and releasing of transports. The (5) testing QA (quality assurance) and pre-production systems step can include but is not limited to the following: importing transports to various QA SIDs as needed, modifying a configuration that is SID specific, adding profile detail content data, authorizing team and unit testing, and issuing a resolution process. The (6) final deployment step can include importing transports to production SID, modifying a configuration that is SID specific, adding profile detailed content data, and authorizing team and unit testing, issuing a resolution process, and validating and closing.

Figure 12A:
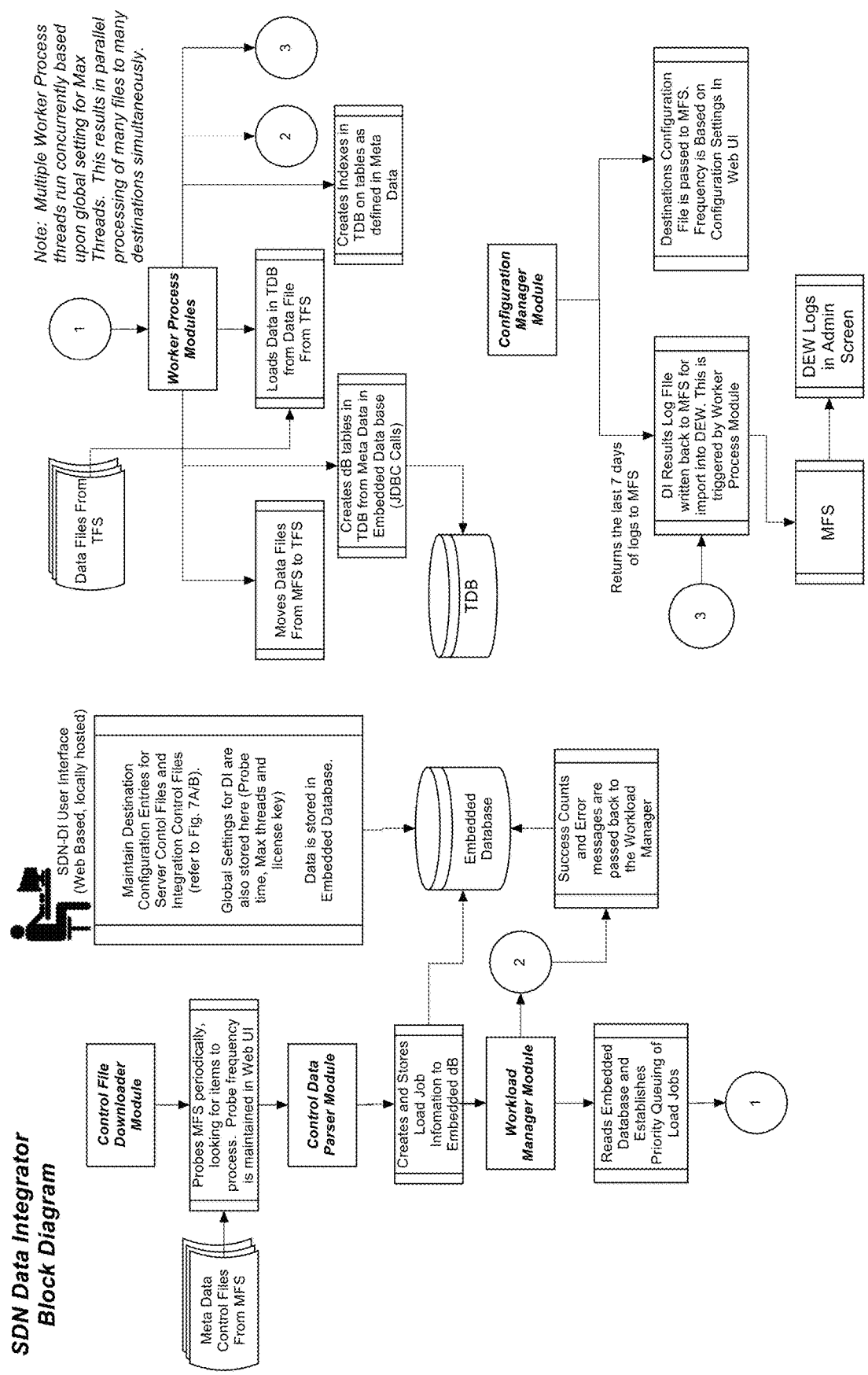
FIG. 12A illustrates another non-limiting embodiment of a detailed block diagram process flow chart for the DI application, illustrating main module and worker module process flows.

Referring now to FIG. 12A, in another embodiment of the EDL method and system disclosed and described herein, wherein the DI application, system, or server 2000 process flow can include a main module which can be sub-divided into the following functional and operable methods, parts, and components. More specifically, a Configuration Manager sub-module process can invoke or push Configuration Data and also Job Log information for the past seven (7) days to the MFS File Server (source directory). Further, a control file down-loader can fetch or download Meta-Data files from the MFS server (source directory). Next, a control data parser sub-module can process the downloaded or fetched Meta-Data and create a load Job. This load Job can be stored in an embedded master database. Further, any new Job created by the control data parser can be passed onto worker processes by the workload manager sub-module. Here, priority queuing can be performed in order to ensure that higher priority Jobs are processed first. Further, following the competition of the load Job by the Worker Module Processes, the work load manager can collect a return code from the Worker Process and updates the Job status in the Embedded Master Database. Following this, the Configuration Manager can trigger once more to update the job information back to the source system.

Still referring to FIG. 12A, the Worker Process Modules being triggered by a signal from the Work Load Manager can be a process that is originates from a server's operating system's thread pool. Here, the Worker Module Processes can perform the following: (1) fetch data file corresponding to the meta-data from the MFS and transfers it to the Target File System (TFS); (2) if it is indicated in the control file that the data has to be loaded into a database, then appropriate database bulk loaders can be triggered via JDBC calls; (3) upon completion of the data load, indexes are created as specified in the control data; and (4) during the whole load process, failures are noted and the error message or the number of successful records loaded and passed back to the work load manager. As to the communication mechanism between DI and the MFS file server, both the Master Module (for the Meta Data) and also the Worker Process Module (for the data file) communicate with the MFS server during their processing. Here, the mechanisms or transfer protocols used for gathering the files from the MFS can include but not limited to FTP, FTPS, SFTP, or via a simple file copy mechanism. Any failures that occur during the file copy can also be stored in the embedded master database and published to the source system as part of the job status.

Figure 13:
FIGS. 13-20 illustrate screenshot user interface displays for one or more embodiments of portals and user interfaces for the DEW application of the disclosure described herein, wherein sample data is shown for illustrative purposes.

Referring now to FIGS. 13-20, a method for setting up and configuration the SDN-DEW or DEW application will now provided, according to one non-limiting embodiment of the disclosure described herein. Here, the SDN-Data Extraction Workbench (SDN-DEW) can be comprised of two transaction codes, an "/SDN/ADMIN" and "/SDN/PROFILES", as shown in FIG. 13. Here, in order to add these transaction codes to a Favorites folder for each of access, an user can rick-click or select a Favorites icon, select "Insert Transaction", and type "/SDN/ADMIN" (without quotes) and select a green check mark. The user can also repeat the step above also for "/SDN/PROFILES" (without quotes). Here, these are the two transaction codes that will be utilized within SDN-DEW or DEW application.

Figure 14:
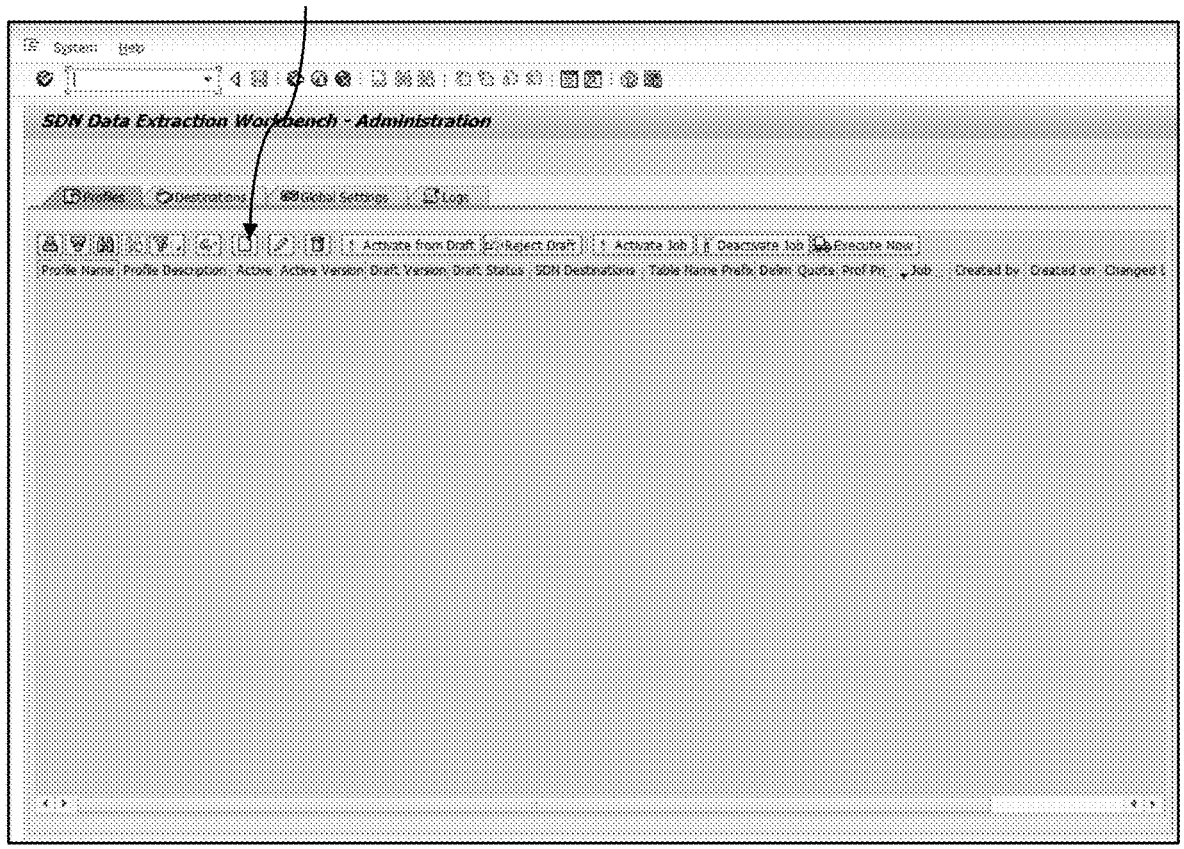
Figure 15:
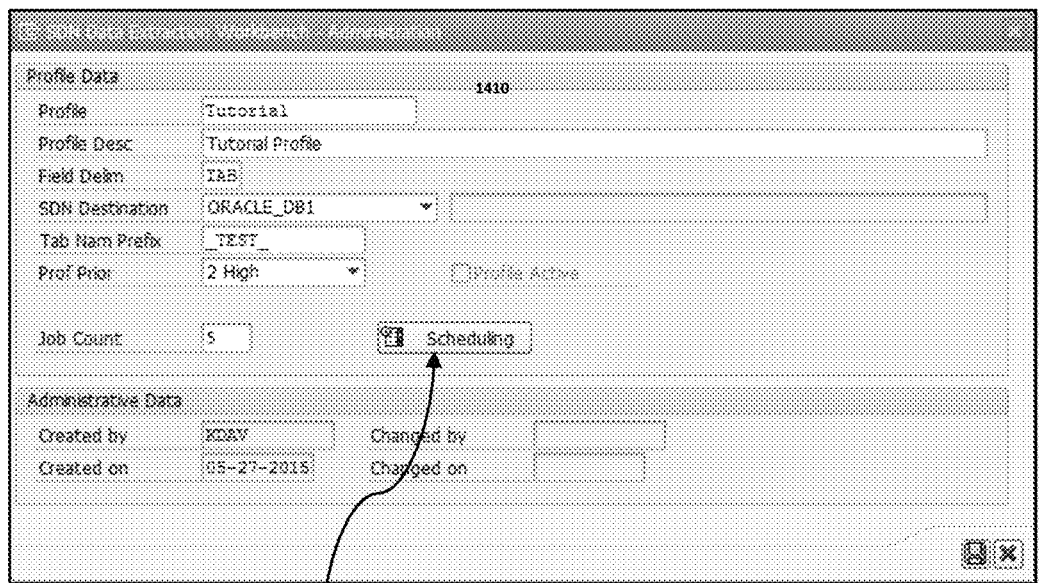
Figure 15A:
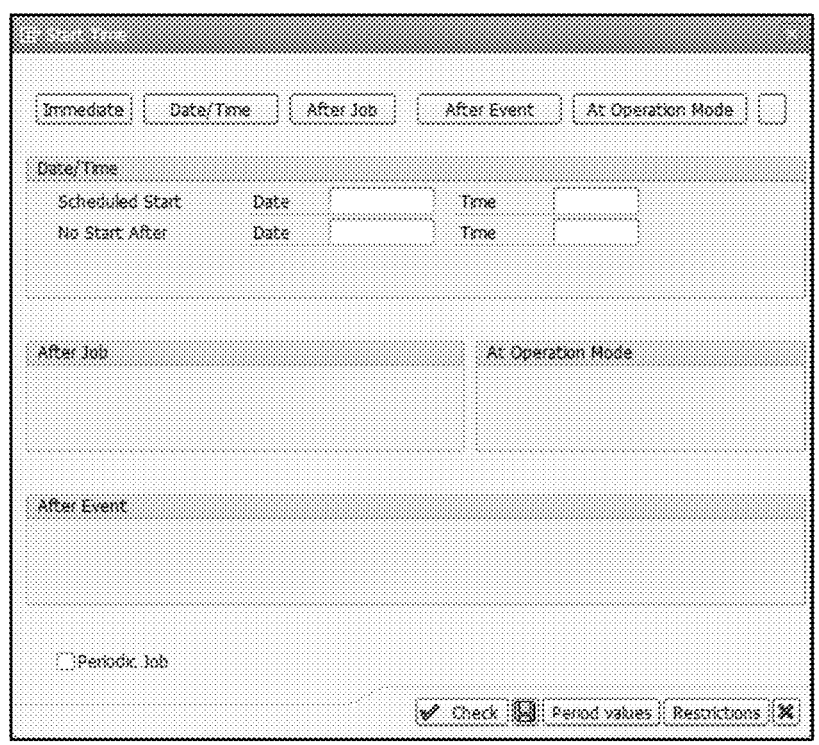

Referring now to FIG. 14, a method of creating and scheduling a profile will now be described, according one non-limiting embodiment of the present disclosure described herein. Here, the process can include double-clicking or selecting the /SDN/ADMIN transaction code (FIG. 13), select the "Profiles" tab at the top of the window, and selecting the Create button 1410 on the toolbar. Once the Create button 1410 is selected, the user will be directed to the screen illustrated in FIG. 15. Referring to FIG. 15, the user can enter a Profile name; enter a Profile Description; enter a Field Delimeter; wherein this delimeter will separate data in a text file (e.g. TAB or ~|~); select a destination database or file system in the SDN Destination field; enter a unique Tab Name Prefix, wherein this Tab Name Prefix ensures that files written to the destination database or file system are unique and do not share an identical file name; set a priority for this profile in the Prof Prior field, such as 1—Very High, 2—High, 3—Medium, 4—Intermediate, 5—Low; and enter or select the number of maximum jobs his profile will be allowed to run in the Job Count field.

Figure 16:
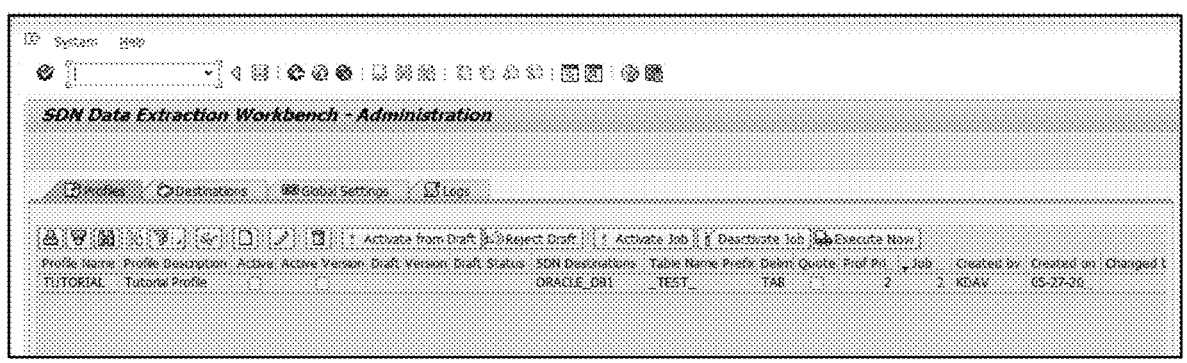

Still referring to FIG. 14, when scheduling the profile the user must specify the conditions that will trigger the profile to start being processed. Hence, the user can select the "Scheduling" icon, wherein the user will then be directed to the screen illustrated in FIG. 15. Referring to FIG. 15, the user can select the preferred scheduling option for this profile, which can include immediate execution, a pre-determine date/time, or one or more triggering events. In one embodiment, these schedule options can include "Immediate", "Date/Time", "After Job", "After Event", or from a "Factory Calendar". In addition, for the job to repeat, the user can check the Periodic Job box at the bottom of the Start Time screen and choose the Period values button below it to define the frequency of repetition (hourly, daily, weekly, monthly, or another specific time-related period). Next, the user can select the Save button in the Period values screen to accept the periodicity and return to the Start Time screen. Here, the Save Start Time changes and Profile Data changes and the newly created profile will populate into the profile list, as shown in FIG. 16.

Figure 17:
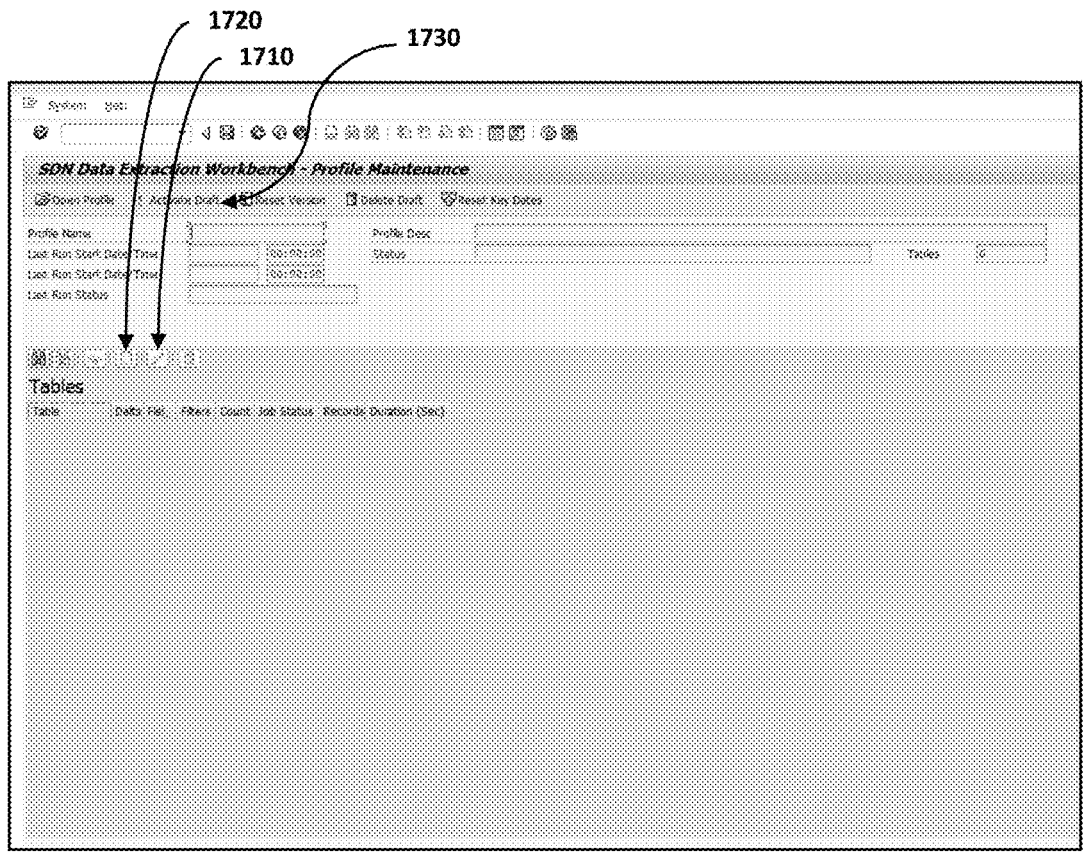
Figure 18:
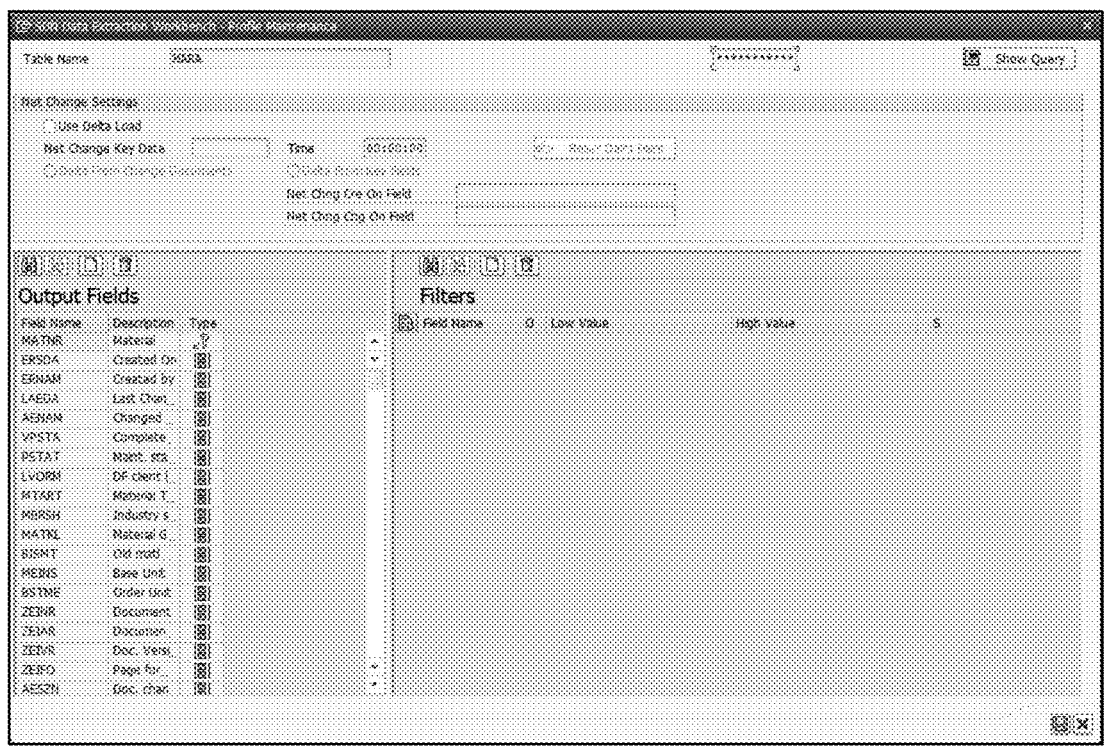

Next, the user will be able to add tables to the created profiles. Here, the user can go back to the screen illustrated in FIG. 13, and select the "/SDN/PROFILES" code and further select the "Open Profile" button illustrated in FIG. 17. Referring to FIG. 17, the user can select the newly created profile and then select the "Change/Create Draft" button 1710. Next, the user can select the create button 1720 and select a Table Name. After confirming, the user will be directed to the screen illustrated in FIG. 18, wherein the output fields from the selected table are shown in the left page of the portal. Next, the user will then select the desired output fields, delete any unwanted fields, and set any desired filters in the right pane of the portal.

Figures 19, 20:
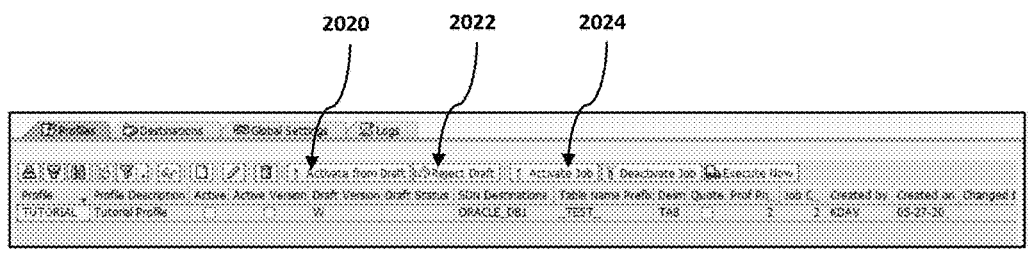

Here, many tables have net change functionality. This utilizes the change documents associated with the table to only pull data that has been altered on future runs. To activate this feature, the user can select the "Use Delta Load" box at the top of the Net Change Settings box. Referring to FIG. 19, the Net Change Key Date field will be set to 01/01/0001 for the initial run to ensure all data in the table is pulled, no matter the date the data was altered. Next the user can select the save button at the bottom right of the window to accept the table additions, and select the "Activate Draft" button 1730 (FIG. 17) from the options at the top and confirming that this is the profile that is to be activated. Next, the activated profile will be flagged for an administrator to review and Activate from Draft. The administrator can review the profile contents and, pending approval, flag or approve the profile as ready to run. In order to complete this step, the user or administrator can go to the screen of FIG. 13 and select the/SDN/DEW Administrator Workbench, which will then direct to the user to the screen illustrated in FIG. 19. Referring to FIG. 19, the user can then select the profile that is to be activated, wherein a notification or indicator "W" is provided indicating a draft version. Next, the user can select the "Active from Draft" button 2020 to active the profile. Next, the "Activate Job" button 2024 can then be selected to run the scheduled job. Alternatively, the admin also has the option to reject a draft by selecting the "Reject Draft" button 2022, which will not approve the profile and return it to the user who created the draft or the profile.

FIGS. 21-30 illustrate various embodiments for the DI application server 2000 graphical user interface (UI) and portal of the EDL system, method, application, and computer program of the disclosure described herein. In particular, the DI application user interface can be a web-based or web-accessible (using a web/internet browser) that can be stored, loaded, or executed on either a user's local or remote servers, or hosted remotely on a third party server, such as a networked "cloud" system. Referring to FIGS. 21-30, the DI application UI can include a Servers console for defining specific hardware and paths for the MFS, TFS, and TDB, as previously disclosed herein according to one or more embodiments. The DI application UI can also include a Destinations console for combining one or more unique MFS, TFS, and TDB combinations that describe and define end-to-end data flows. In particular, the DI application UI can allow a user or admin to create valid configuration entries that allows for the DI application to connect, move, and load the required and requested data at all required points throughout the integration and EDL system. In addition, the DI application UI and process can allow a user or admin to collect data that is transmitted to the DEW application (through MFS) via the configuration files. In addition, this data can be viewable in the DEW application, which defines where the data from a specific profile will flow to, such as shown in FIGS. 7A and 7B.

Figure 22:
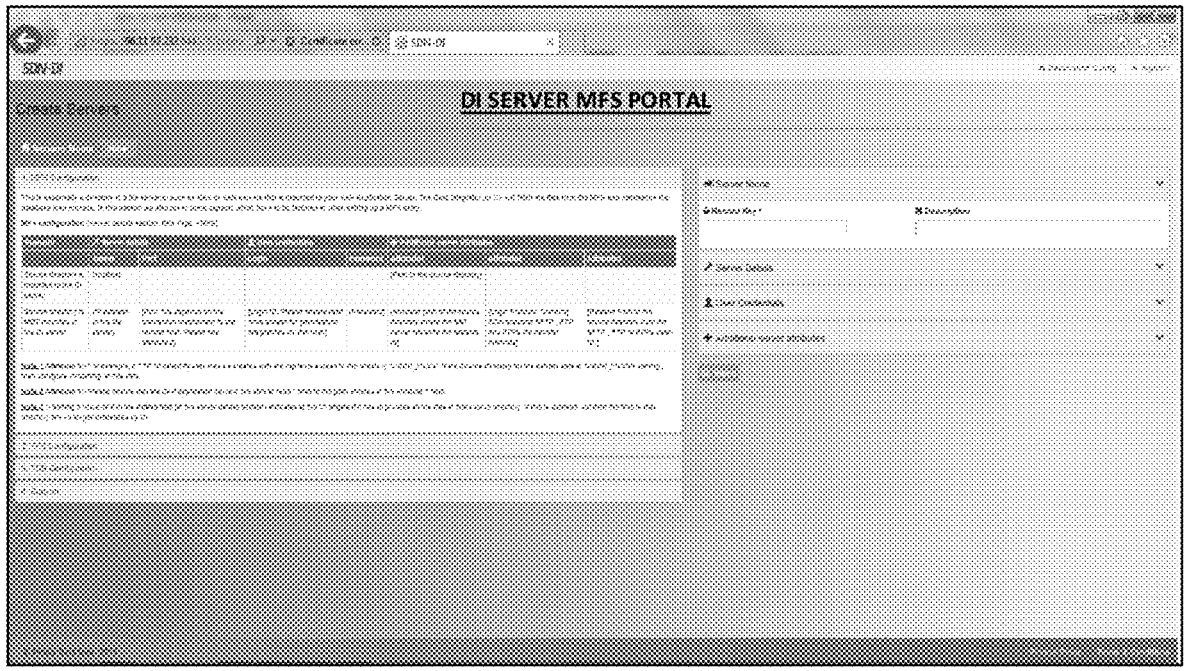
Figure 23:
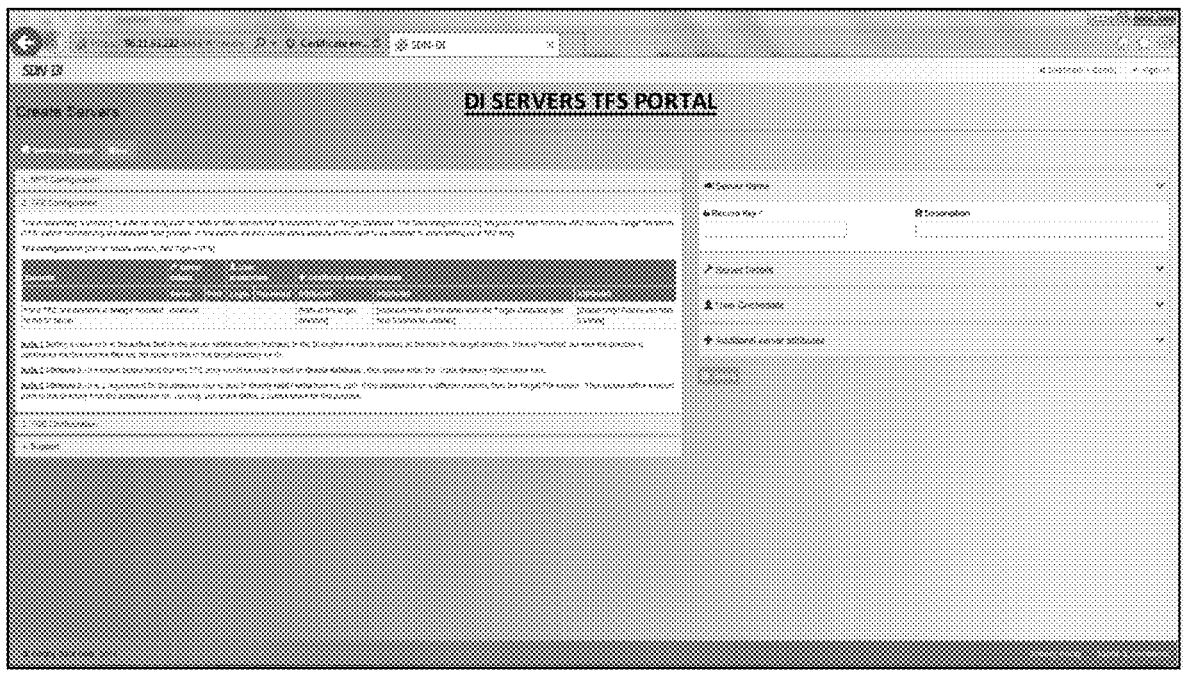
Figure 24:
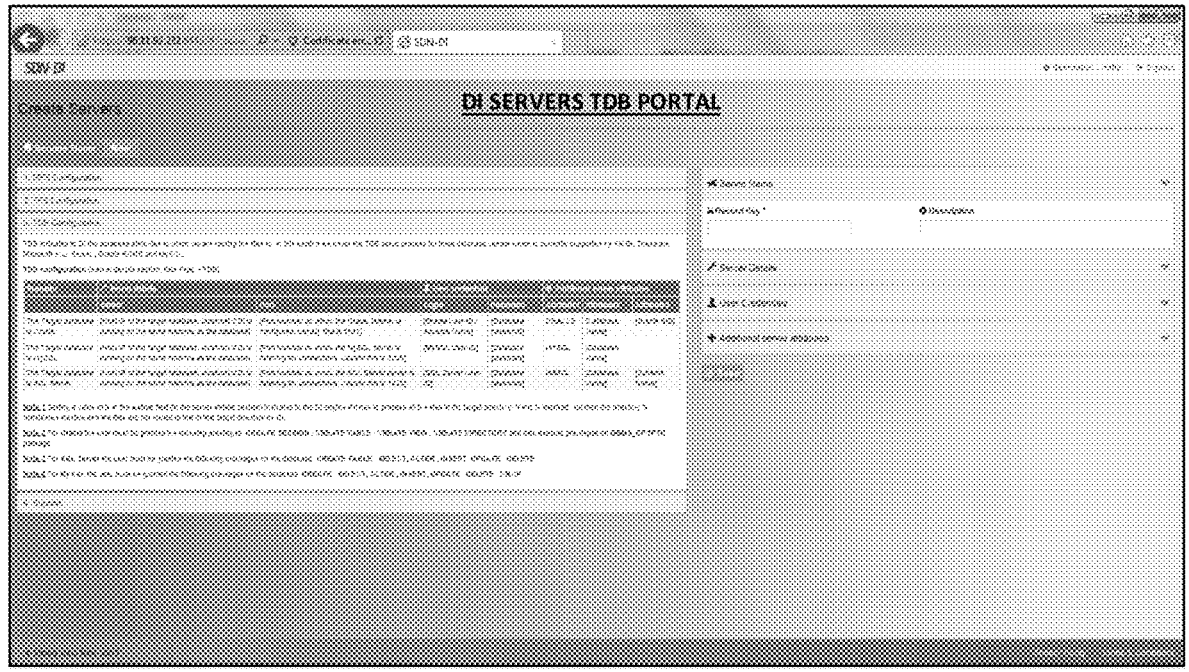
Figure 25:
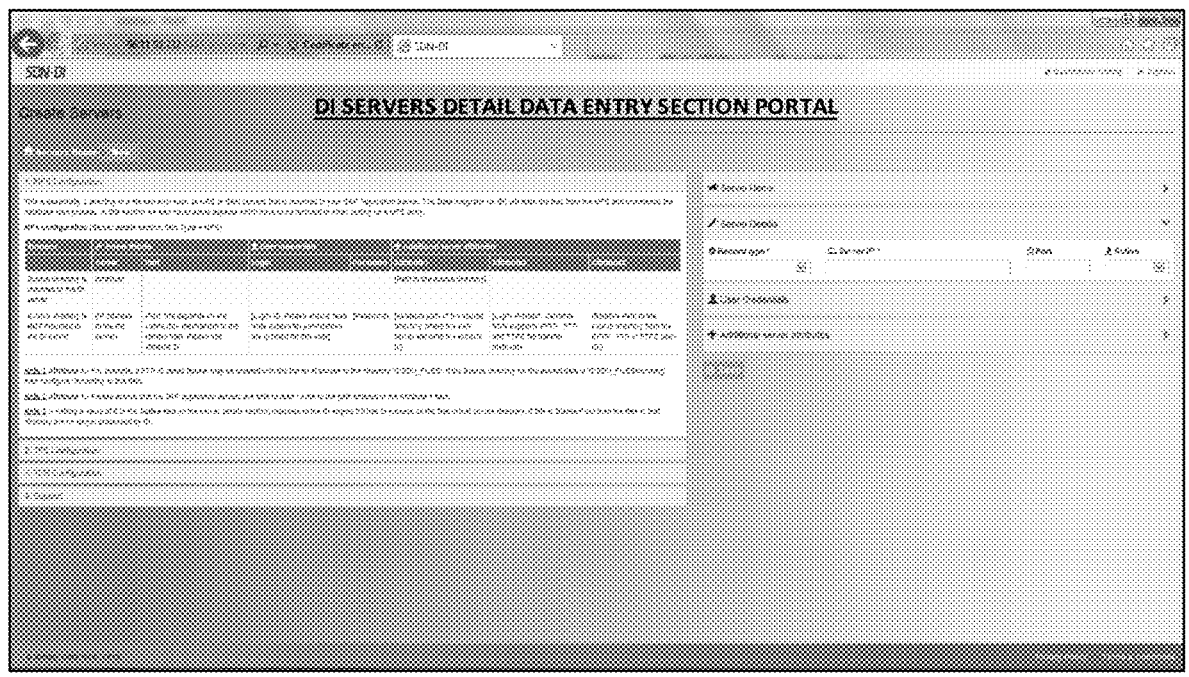
Figure 26:
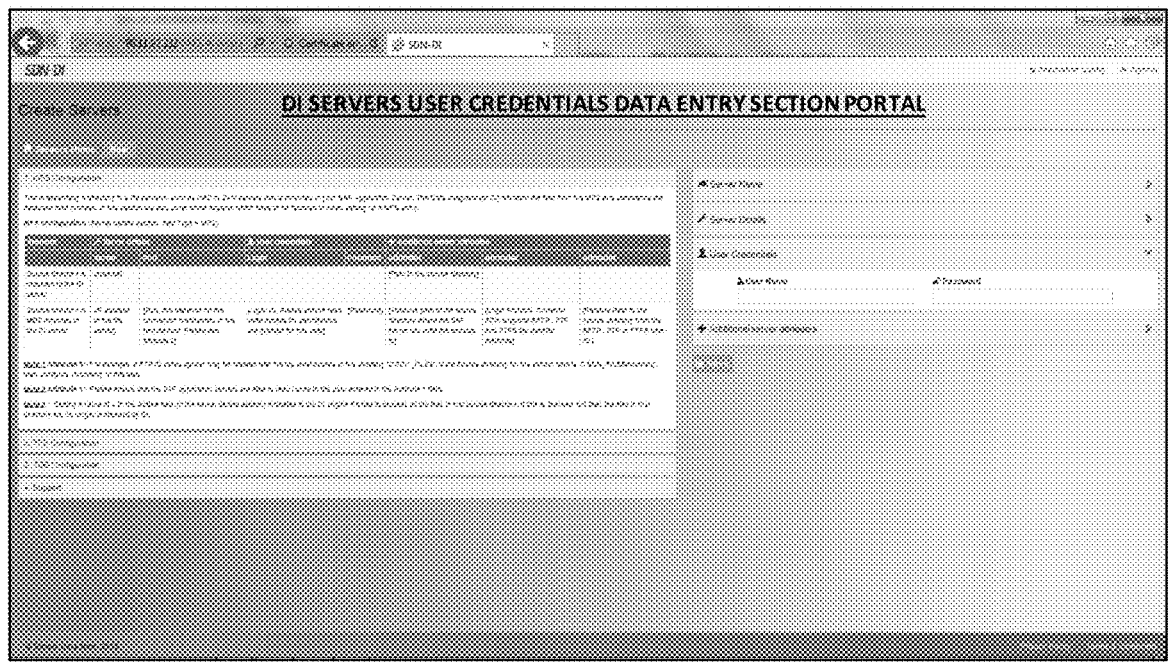
Figure 27:
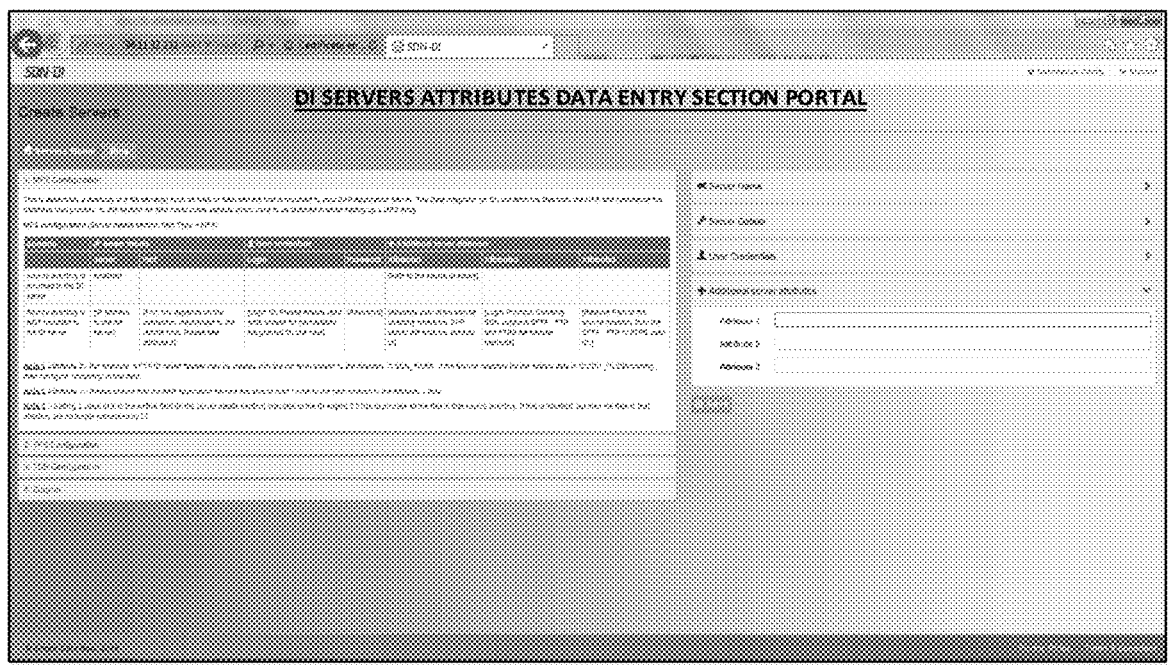
Figure 28:
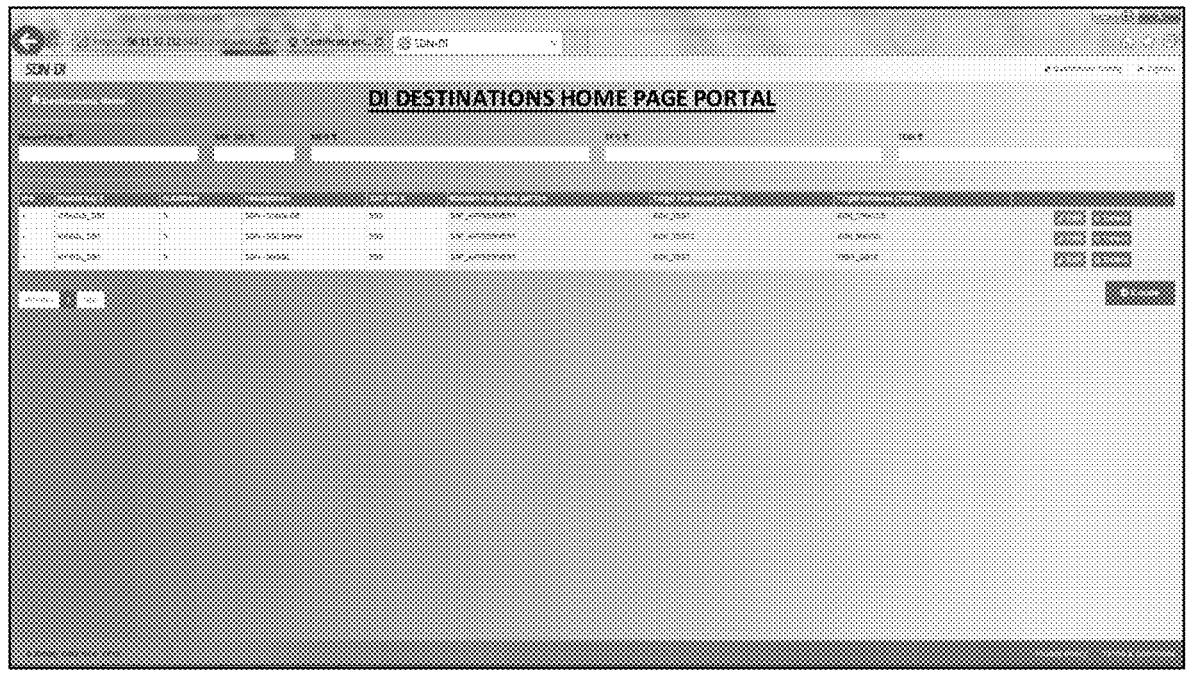
Figure 29:
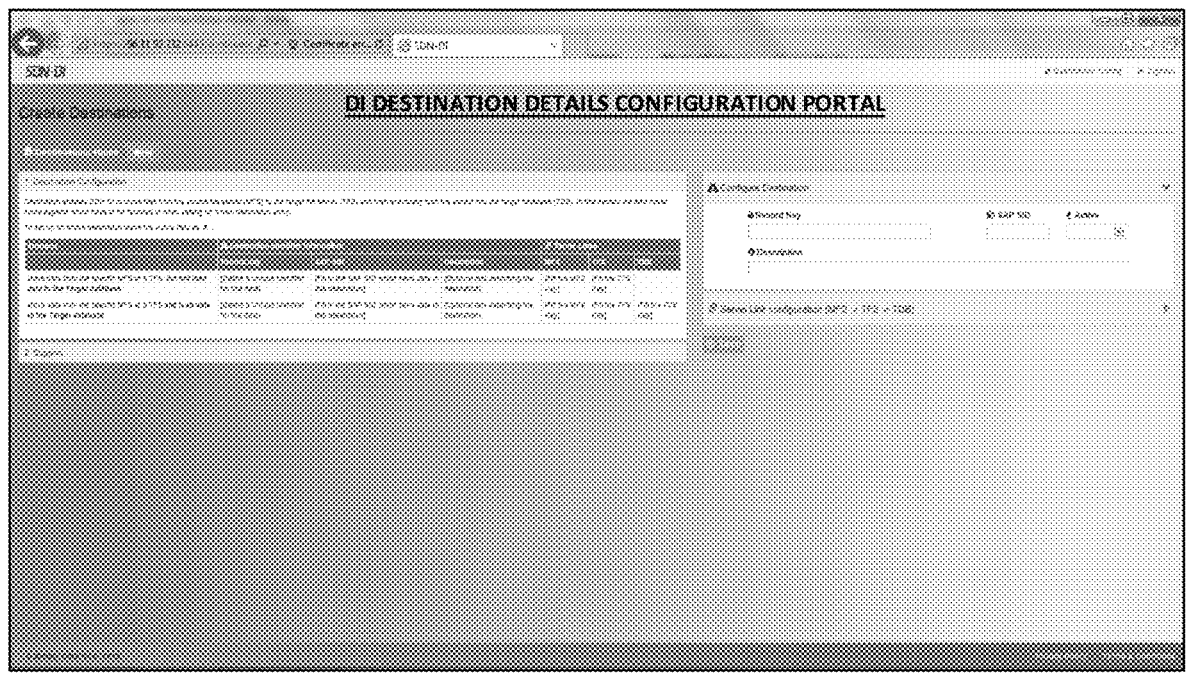
Figure 30:
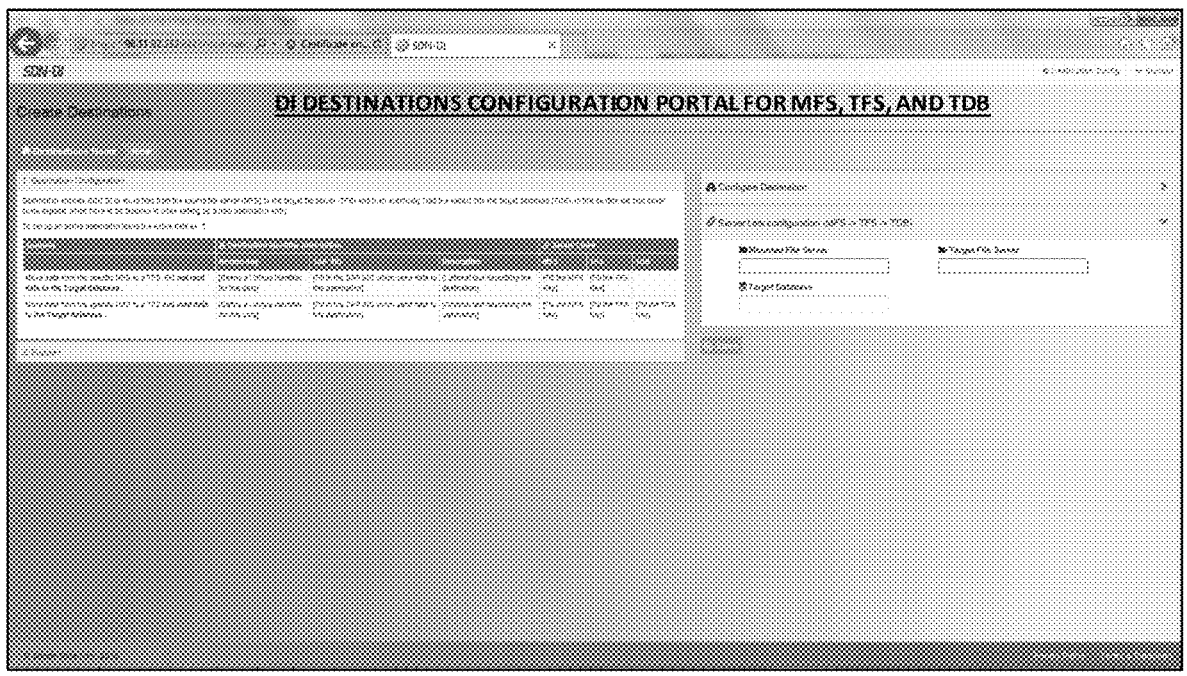

Still referring to FIGS. 21-30, FIG. 21 illustrates one embodiment of the DI application UI home page portal, namely, having the following entries, columns, and properties: Record Type, Record Key, Active Status, Server Description, Server IP address, Server Port, User ID, Server Password, a first Attribute, a second Attribute, and a third Attribute, and functionality for creating, adding, editing, and removing the aforementioned entries. In particular, when the Create icon is selected, the user will be directed to the UI illustrated in FIG. 22. Within the portals of FIG. 22-27, the UI drop-down menu will allow the user to maintain various entries for the MFS, TFS, and TDB. Here, each section can include documentation on a left pane of the UI and data entry section for Server Name, Server Details, User Credentials, and Attributes on a right hand pane. For example, FIG. 22 illustrates the UI portal for creating or modifying MFS entries, FIG. 23 illustrates the UI portal for creating or modifying TFS entries, and FIG. 24 illustrates the UI portal for creating or modifying TDB entries. In addition, FIG. 26 illustrates the UI portal for entering user credentials and FIG. 27 illustrates the UI portal for entering various attributes. FIG. 28 illustrates a UI portal home page for Destinations, wherein the all the Destinations can be viewed, followed by data entry screen for data collection. FIGS. 29 and 30 illustrate UI portals for configuring the Destinations, wherein in one embodiment the Destinations can be a unique combination of one or more of a Record Key, an SAP system ID, an MFS, a TFS, and a TDB. It is contemplated within the scope of the disclosure described herein, that the UI and portal illustrations of FIG. 21-30 are exemplary and for illustration purposes, and that the DI application UI may include any other type of configuration, description, layout, and graphical elements.

In another embodiment of the disclosure described herein, a system operable to extract data from an enterprise resource planning (ERP) system and direct the extracted to one or more end user destinations is provided. Here, the system can include a first module operable to receive mounted file system data, wherein the mounted file system data further identifies a mounted file system server and directory, a second module operable to receive destination data, wherein the destination data is comprised of a target file server or a target database, a third module operable to write the mounted file system data and destination data to a control file, a fourth module operable to receive profile data, wherein the profile data references the destination data, wherein the profile data is further comprised of defined requested data and an authorization request, and wherein the requested data is comprised of one or more ERP data tables or ERP data fields, a fifth module operable to ping the mounted file server directory in order to detect the received profile data, in response to detecting the profile data, a sixth module operable to determine the destination data from the profile data, a seventh module operable to authorize the profile data in response to the authorization request, an eighth module operable to extract the defined requested data from one or more ERP databases, an ninth module operable to transmit or load the extracted requested data to the target file server or target database identified in the destination data, and a tenth module operable to transmit the extracted data from the target file server or target database to a user terminal.

In another aspect of the disclosure described herein, a computer program product embodied on a non-transitory computer readable medium for extracting data from an enterprise resource planning (ERP) system and directing the extracted to one or more end user destinations is provided. The computer program product can include a first computer code for receiving mounted file system data, wherein the mounted file system data further identifies a mounted file system server and directory, a second computer code for receiving destination data, wherein the destination data is comprised of a target file server or a target database, and a third computer program code for writing the mounted file system data and destination data to a control file. The computer program product can further include a fourth computer code for receiving profile data, wherein the profile data references the destination data, wherein the profile data is further comprised of defined requested data and an authorization request, and wherein the requested data is comprised of one or more ERP data tables or ERP data fields. In addition, the computer program product can include a fifth computer code for pinging the mounted file server directory in order to detect the received profile data, and in response to detecting the profile data, a sixth computer program code for determining the destination data from the profile data. Further, the computer program product can include a seventh computer program code for authorizing the profile data in response to the authorization request, an eighth computer program code for extracting the defined requested data from one or more ERP databases, a ninth computer program code for transmitting or loading the extracted requested data to the target file server or target database identified in the destination data, and a tenth computer program code for transmitting the extracted data from the target file server or target database to a user terminal.

Generally, an Integration platform as a service (iPaaS) can provide a set of cloud-based tools to address these challenges. An iPaaS platform can provide a design time for developers to design integration flows, and to map data objects of different formats between source applications and target applications.

Figure 31:
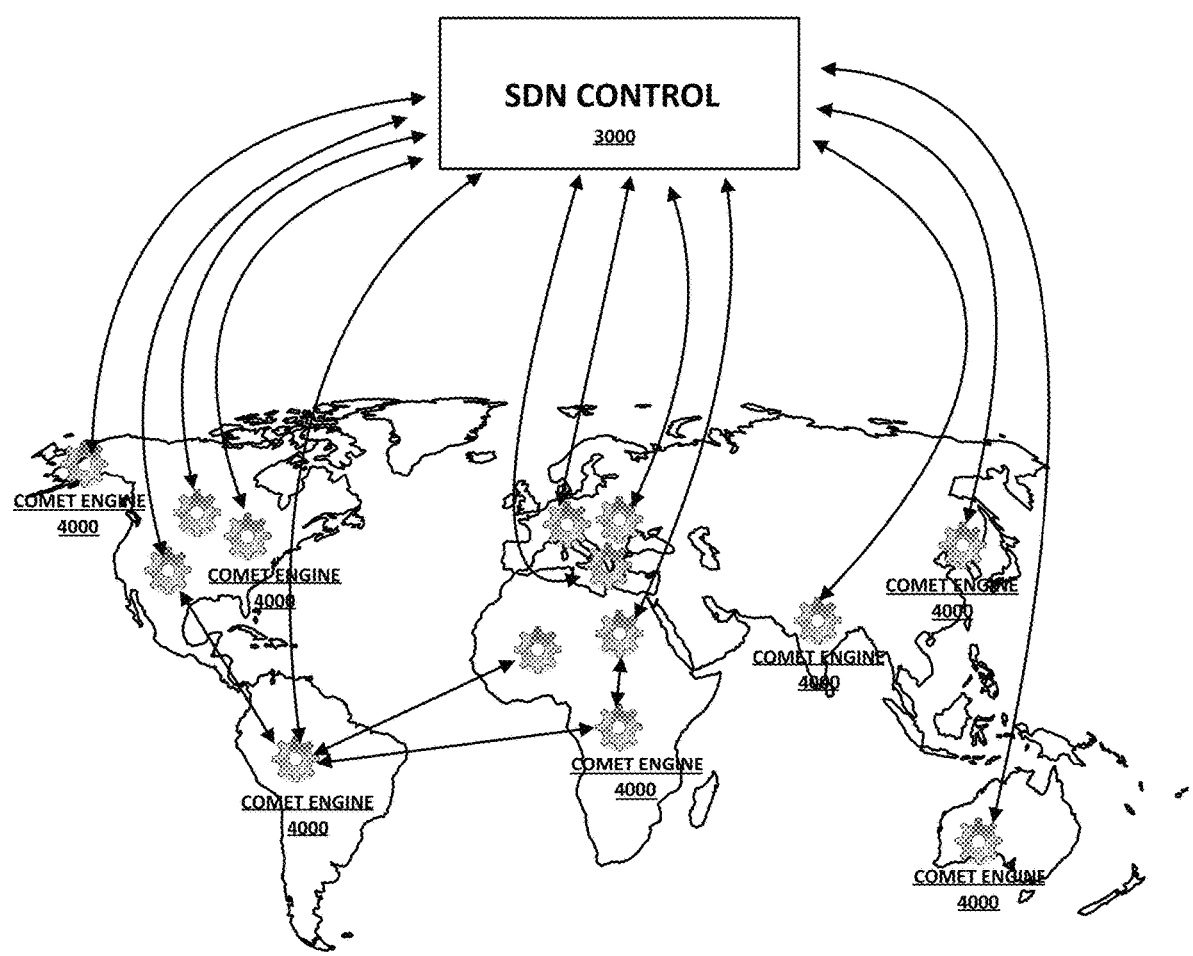
FIG. 31 illustrates a general overview diagram for one non-limiting exemplary embodiment of the SDN Control and Comet Engines of the disclosure described herein.

FIG. 31 illustrates one non-limiting exemplary embodiment of an Integration platform as a service (iPaaS) network system and method of the disclosure described herein. Here, the iPaaS network of the disclosure described herein can generally include a first application component SDN Control 3000 bi-directional communication with a plurality of distributed second application components, SDN Comet Engines 4000. Generally, SDN Control 3000 can operate in lieu of or in conjunction with SDN DI, preferably the user interface working in lieu of SDN DI.

Still referring to FIG. 31, SDN Control 3000 can generally operate as a cloud-based system, or hosted on one or more distributed server systems. Here, SDN Control 3000 can provide users with the ability to configure, define, and set various integrations for retrieving, transmitting, extracting, or loading various types of data and metadata from one or more types of databases or data storage systems. In general, the primary tasks of SDN Control 3000 can include creating and defining individual licenses for the SDN Comet Engines 4000; defining one or more data sources that the Comet Engines 4000 can see, discover, seek, or find; define data source origin, data source destination, schedule, table and field contents; provide user management controls; provide overall system monitoring, tracking, history; and entering various support tickets, among others.

Still referring to FIG. 31, SDN Comet Engines 4000 can generally operate as a live application or executable software engine that can operate in lieu of or in conjunction with SDN DI, preferably in lieu thereof. Generally Comet Engines 4000 can sit or operate on one or more servers within a user or client network and facilitate at least four tasks, namely: pinging one or more requests to see if one or more distributed Comet Engines 4000 are running and are reachable and/or discoverable; send one or more metadata requests to gather tables and fields from the databases (e.g., data sources) that a Comet Engine 4000 can see, discover, or find; process one or more data extractions from origin source, such as from extraction to compression to encryption to movement; and process data imports to destinations, such as movement to de-encryption to decompression to loading. In general, each Comet Engine 4000 may need one or more digital license tokens to operate. Here, based on a request from SDN Control 3000, each Comet Engine 4000 can move data within a network to SDN Control 3000, which can then turn and send data to another Comet Engine 4000, among other operations. In addition, it is noted that SDN DEW can operate in conjunction with SDN Control 3000 and SDN Comet Engines 4000, wherein SDN DEW can receive its configuration and log files, as previously disclosed herein, from one or more SDN Comet Engines 4000 in lieu of SDN DI. In addition, SDN DEW can be configured as an origin data source in SDN Control 3000.

Still referring to FIG. 31, each SDN Comet Engine 4000 can operate as a stand-alone software engine within a network and can pass commands to databases. Specifically, each SDN Comet Engine 4000 of the disclosure described herein is comprised of a light application in size not requiring extensive computing resources or resource intensive hardware or software resources. Moreover, each Comet Engine 400 communicates bi-directionally in a secure and authenticated environment. In addition, SDN Control 3000 operates as a "server-less" environment which can handle various users, set system configurations, provide central job scheduling and monitoring. Further, SDN Control 3000 provides a secure and highly controlled environment because each SDN Comet Engine 4000 communicates to each other through SDN Control 3000. Specifically, such a configuration allows users to share data between themselves (such as a corporate network) which can create a marketplace wherein users or companies requiring data services (e.g., machine learning/artificial intelligence, data sciences, etc.) and users or third parties who provide such data services to seamlessly exchange various types of data with each other.

Still referring to FIG. 31, each SDN Comet Engine 4000, or data engine, is a live application and/or running/active process within a computing network system that can request metadata from a user selected or defined database, wherein the defined database can have various names. In addition, each comet engine receives instructions from the cloud, such as SDN Control 3000, that a network user or network client has set up a new data source. Here, from within the user's network, the comet engine can see the database within the user's network, and using prior granted credentials, the comet engine can automatically log into the database and retrieve metadata, such as the list of all tables and fields (not the data within them). The comet engine can then send this retrieved metadata to one or more cloud-based object storage systems connected to SDN Control 3000. Hence, when a user within the network wants to use the specified data source in a data integration scenario (via one user interface portal), that user can then select the table and the fields that exist in the database, similar to the previously disclosed operation with respect to SDN DEW. In addition, each comet engine can receive various type of jobs and tasks from the cloud (e.g., request metadata, pull data from a table, or push data into a table). In addition, each comet engine can provide limited history which sends it to SDN Control, such that it includes a full logging history of all the comet engines jobs and operations.

Figure 32:
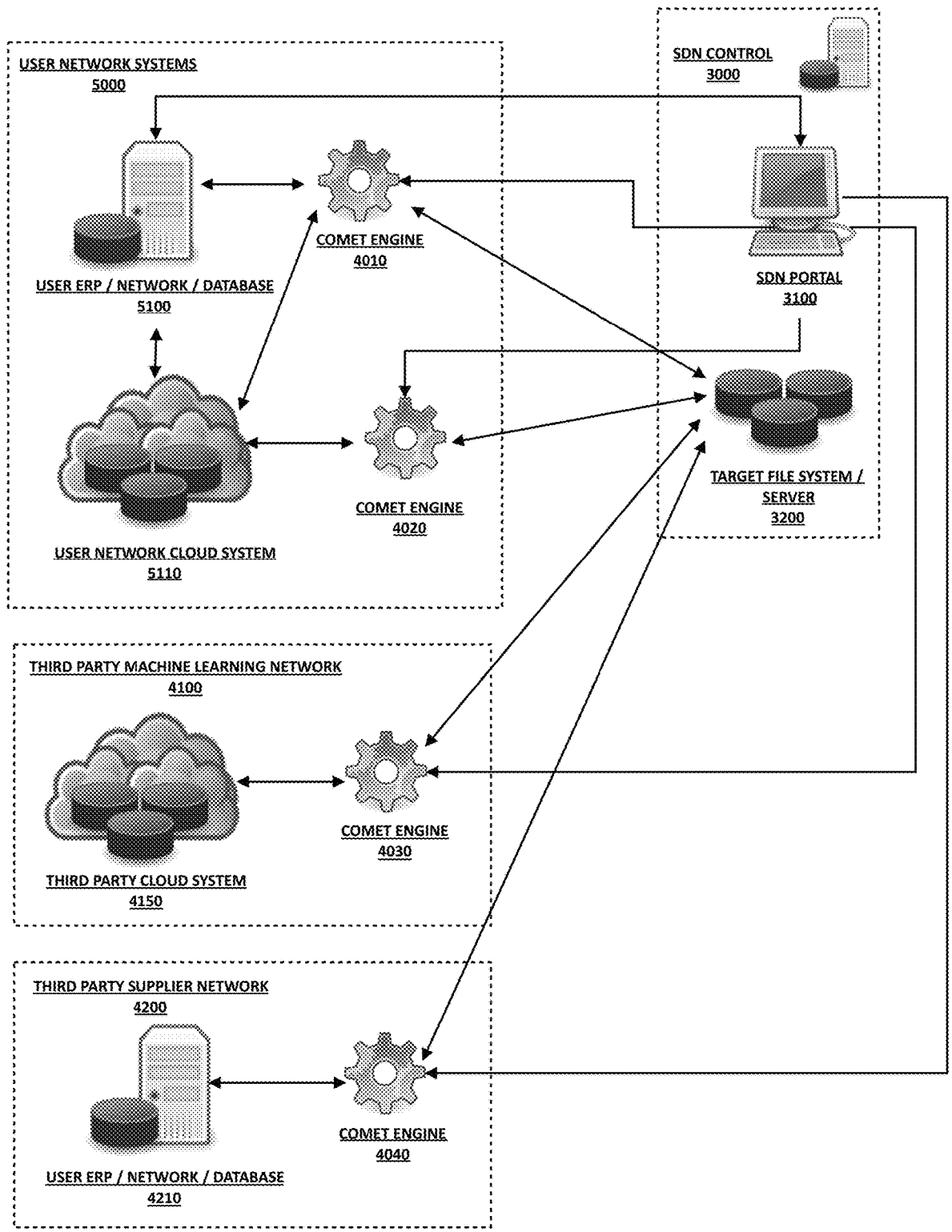
FIG. 32 illustrates another block diagram of a more detailed overview of a network for the SDN Control and Comet Engines of the disclosure described herein according to one non-limiting exemplary embodiment.

Referring to FIG. 32, a general overview is illustrated for one non-limiting exemplary embodiment of the iPaaS SDN Control and distributed SDN Comet Engine network system and method of the disclosure described herein. Here, the network can include SDN Control 3000 which can include an SDN Control Portal 3100 and a Target File System 3200. In addition. SDN Control 300 can include additional back-end databases/servers for handling/receiving/migrating/transferring data from one or more user networks 5000/5100/5110, Comet Engines 4000-4040, Target File System 3200, third-party machine learning systems 4100/4150, and third-party supplier networks 4200/4210, among others. Further, SDN Portal 3100 can be any type of cloud or web-based type of user-interface software application portal, such as shown with respect to FIGS. 33-44B. In addition, the Target File System 3200 can be any type of cloud-based storage/integration solution or object storage solution that can allow a user to store and retrieve any amount of data and operate in conjunction with one or more SDN Comet Engines 4000, including but not limited to, Amazon® Web Services (AWS), Amazon® S3, Microsoft® Azure, among others. In addition, such cloud-based file systems 3200 can provide various types of storage classes for various types of use cases.

Still referring to FIG. 32, user network 5000 can install Comet Engines 4010 and 4020 within their firewall on their ERP, network, server, and database network system 5100 and network cloud systems 5110. Here, once Comet Engines 4010 and 4020 are installed, they begin pinging SDN Control 3000 and/or other comet engines for instructions, jobs, scheduling, or one or more executable tasks. Next, any one or more users having privileges within user network 5100 can request data by creating and defining one or more new data sources via SDN Control 3000, such as via SDN Portal 3100. Here, the data sources can be any one or more databases that a comet engine can see or discover. For example, there may be two or three different databases for which a particular comet engine can see or discover. Alternatively, a comet engine may be configured to only see or discover particular databases but not others. For example, a comet engine by may installed to see or discover data from a third party, such as Comet Engine 4030 retrieving data from third party cloud systems database 5200, and/or or comet 4040 retrieving data from third party supplier network database 5210. As another example, should company A choose to receive data from company B, across firewalls, then company A may open the Data Source to company B as a Destination only. Accordingly, there would not be a circumstance where company A or company B's Data Sources are available to each other as an Origin. Hence, such a system can prevent an external company from viewing and retrieving meta data or actual data within a Data Source from another company. Still referring to FIG. 32, once the new data source is configured for a data integration operation, such as a user name, password, credentials, IP address, JDBCS, URL strength, etc., then either comet engines 4010 and 4020 will discover such new data source request via their continuously pinging operation and begin executing the task. Specifically, either Comet Engines 4010 and 4020 will begin retrieving, pulling, and extracting data and metadata (e.g., tables, fields, etc.) from the user defined databases within the user network 5000 systems and further pushing the retrieved and extracted data to one or more back-end or cloud servers and databases for SDN Control 3000. At this stage, once the metadata is received by SDN Control 3000, then SDN Control 3000 may instruct any of Comet Engines 4010, 4020, 4030, and/or 4040 to retrieve an encryption key, encrypt and compress the data and metadata that is to be retrieved or extracted from the data source and move the encrypted and compressed data to a cloud storage bucket such as Target File System 3200, which operates as an intermediary storage or data staging system, wherein another comet engine will process, decompress, decrypt, and load the data into a target database, which may be any of 5100, 5110, 4150, and/or 4210. Here, any of Comet Engines 4010, 4020, 4030, and 4040 may further retrieve the loaded data from SDN Target File System 3200 to send and import back to the user's network and databases.

Figure 33:
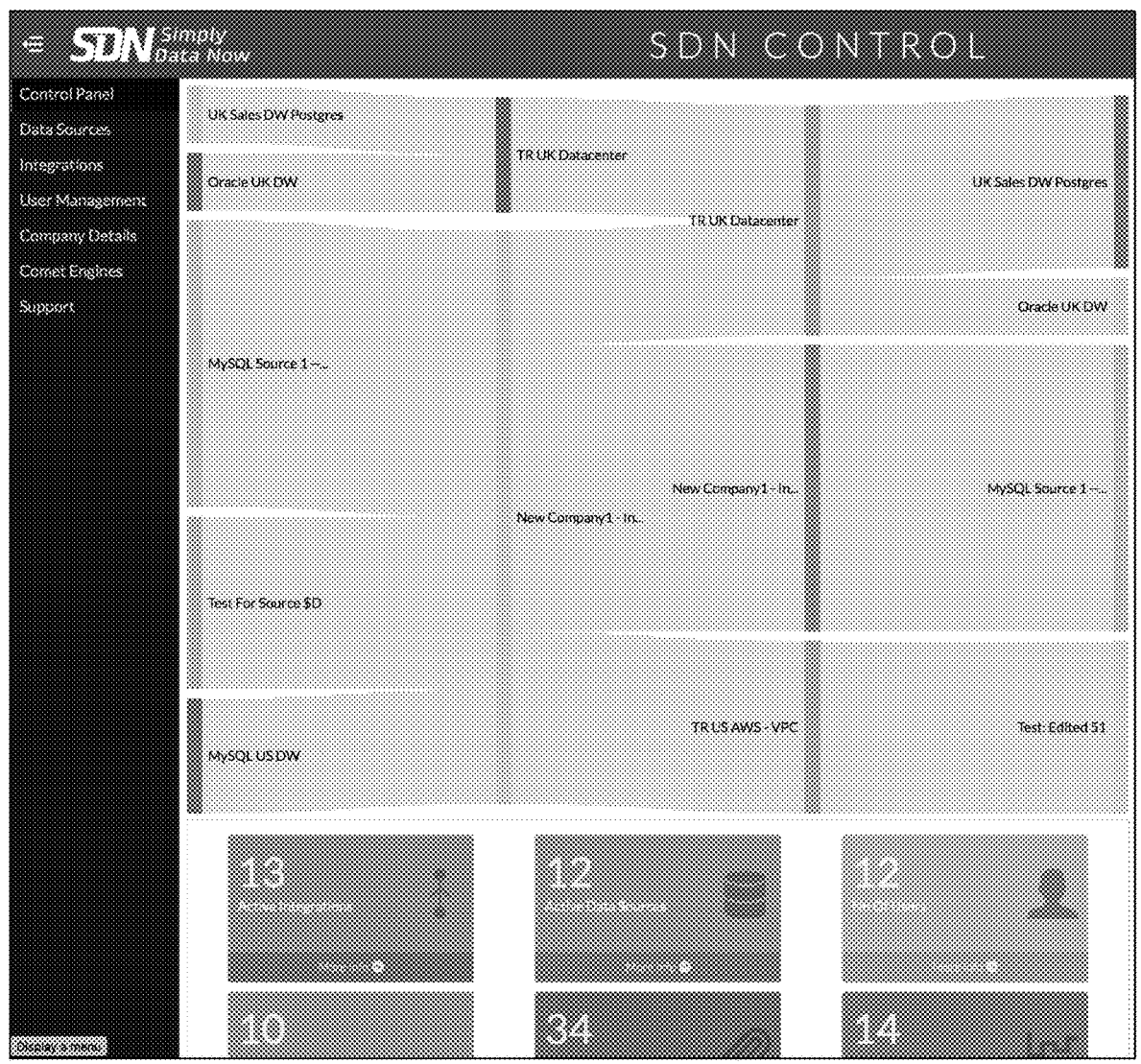
Figure 34:
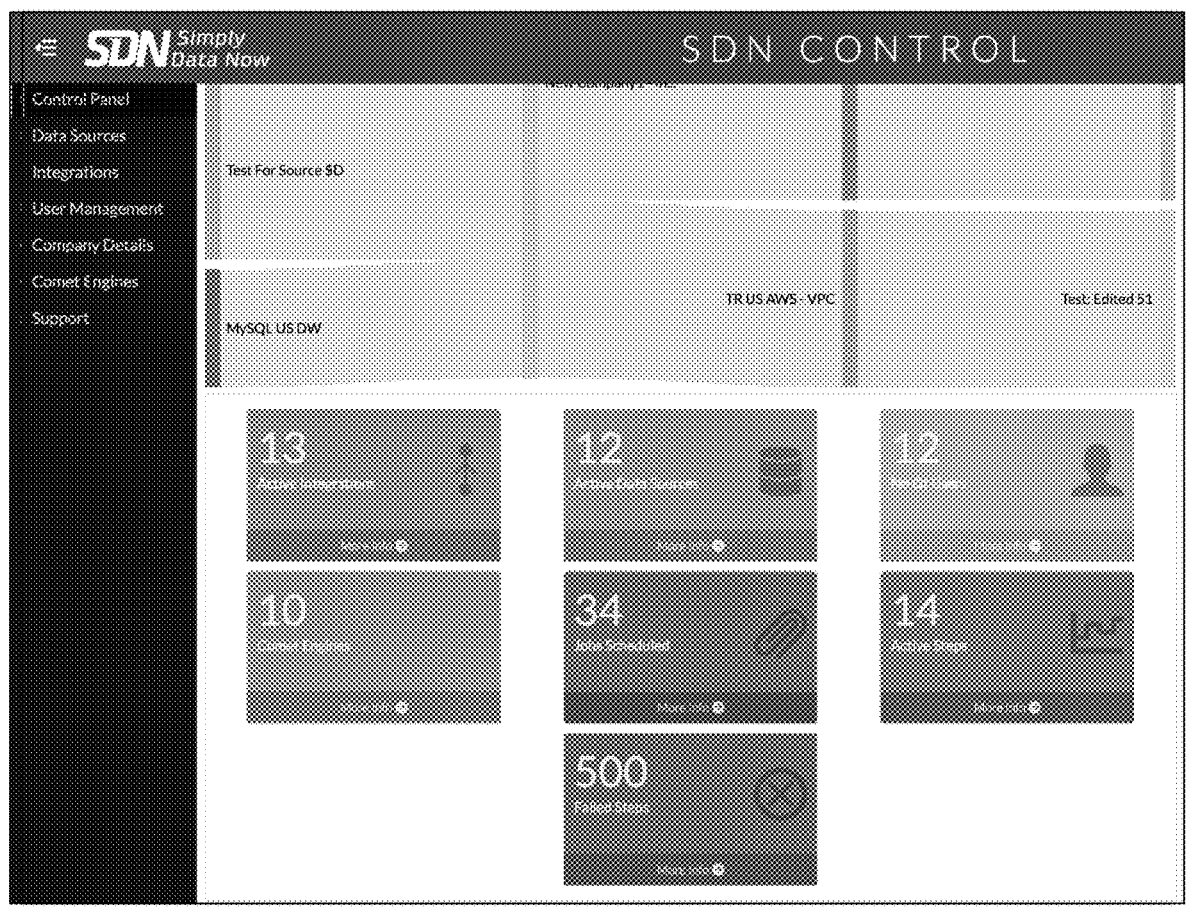

FIGS. 33-43B further illustrate various screenshots of one or more non-limiting exemplary embodiment portals for SDN Control 3000 and SDN Portal 3100 as disclosed herein. FIGS. 33-34 illustrate one non-limiting exemplary embodiment of a control panel user interface display or portal, wherein the user interface shows current active integrations in a Sankey type of diagram, which can illustrate a data integration from origin/source to destination, including the associated comet engines of the disclosure described herein. In particular, the far right and left colored sections of the diagram can illustrate the original and destination data sources, and the middle section can illustrate the origin and destination comet engines. In addition, the user interface display can further illustrate other related logs and statistics.

Figure 35:
Figure 36A:
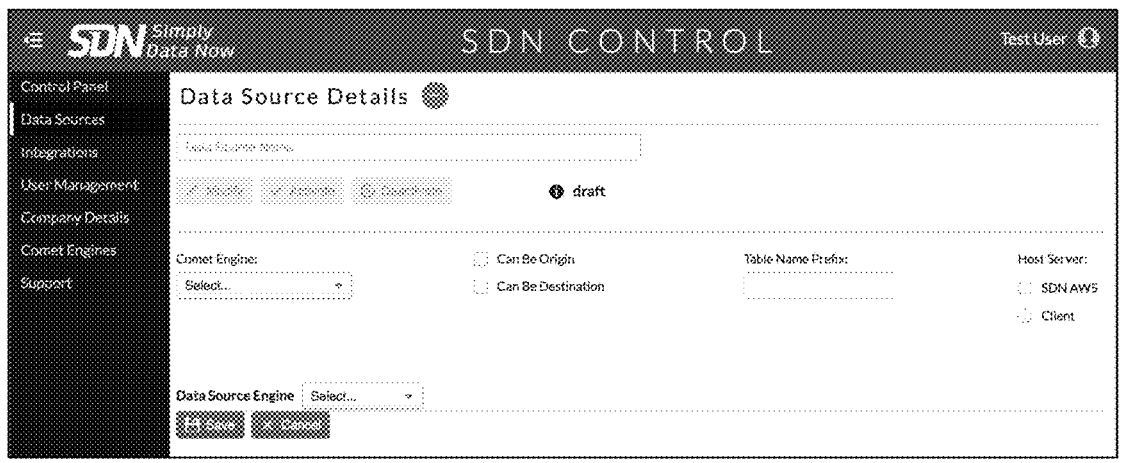
Figure 36B:
Figure 36C:
Figures 37A, 37B, 37C, 37D, 37E:
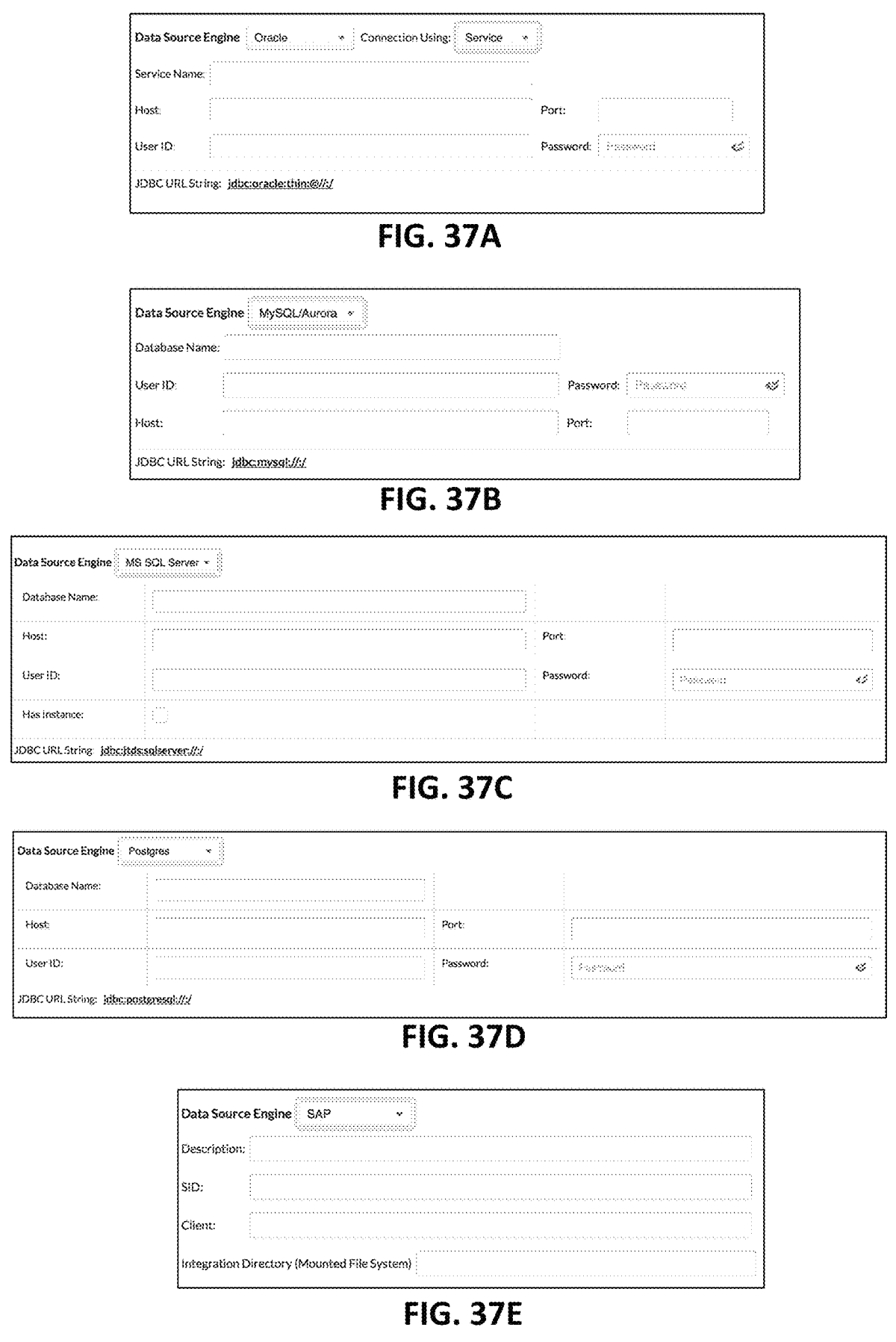

FIG. 35 illustrates one non-limiting exemplary embodiment of a user interface display or portal for current active, inactive, or draft integrations, including the data source, origin, destination, associated/linked comet engine(s), data source engine(s), and sync times. In particular, a user can view as to whether a data source can be either or both an origin or target/destination source. FIGS. 36A-37E illustrate various non-limiting exemplary embodiments for creating/defining/configuring an integration within a user interface display or portal for defining, setting, and configure origin sources or destination targets and associating or linking them to one or more comet engines to be received by SDN Control 3000 of the disclosure described herein. In particular, referring to FIGS. 36A-36C, the user may define the data source name and associated table name prefix, host server, and select whether the data source can be an origin (for pulling data) or a destination (for pushing data), or both. FIGS. 37A-37E illustrate various data source engines associated with the defined data sources. For example, such data source engines may be Oracle®, MySQL/Aurora, Postgres, and SAP, among others. Once the data sources, data source engines, and associated comet engines have been configured by the user/admin, the new data integration can be created.

Figure 39A:
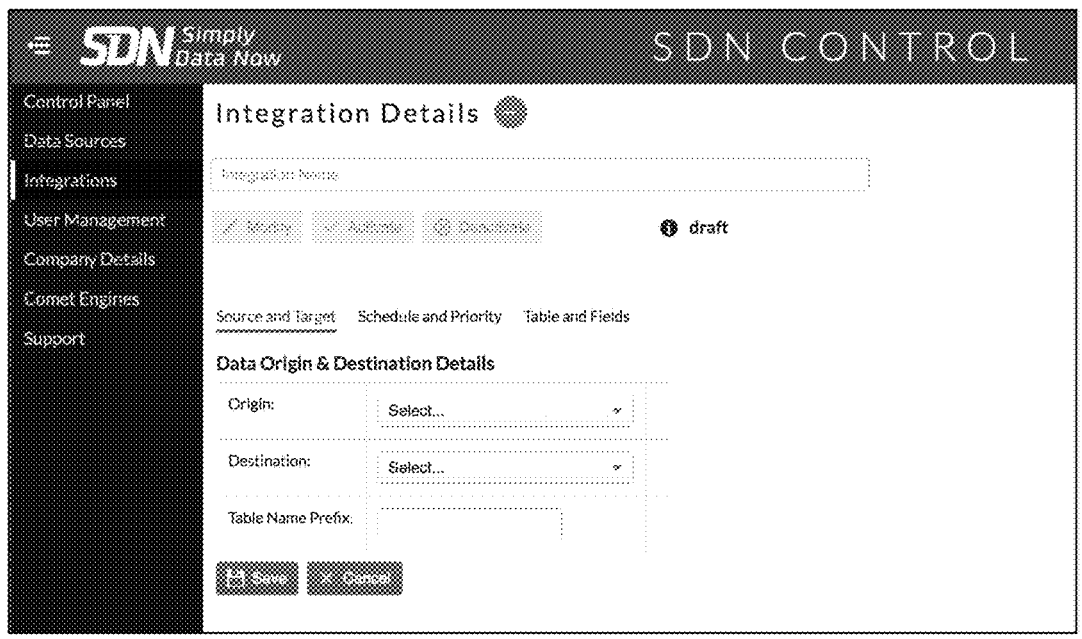
Figure 39B:
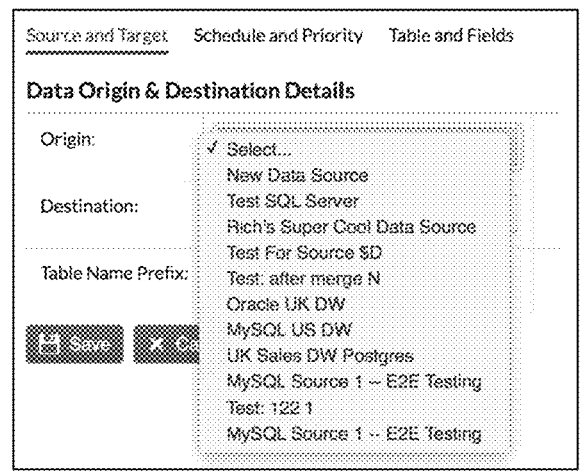
Figure 39C:
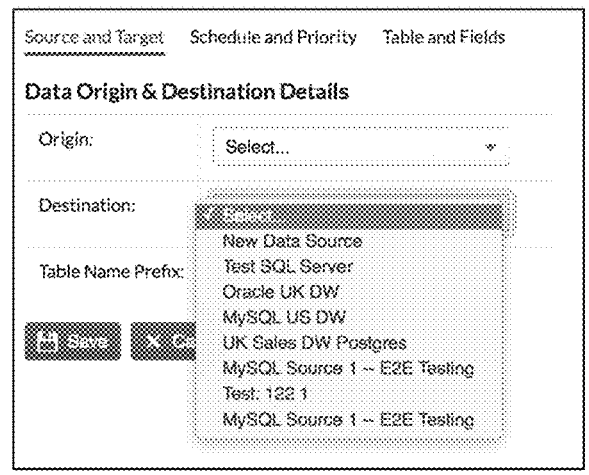
Figures 40A, 40B, 40C:
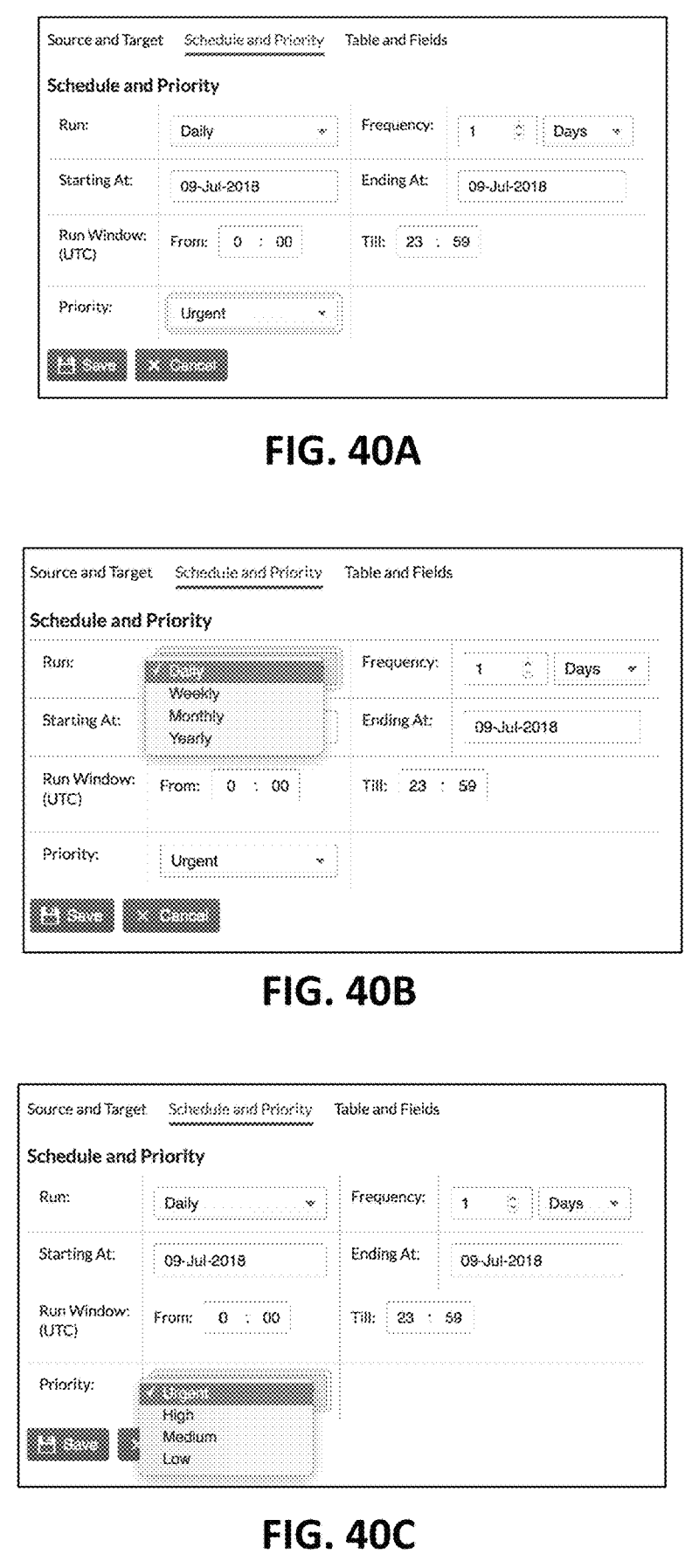
Figure 42A:
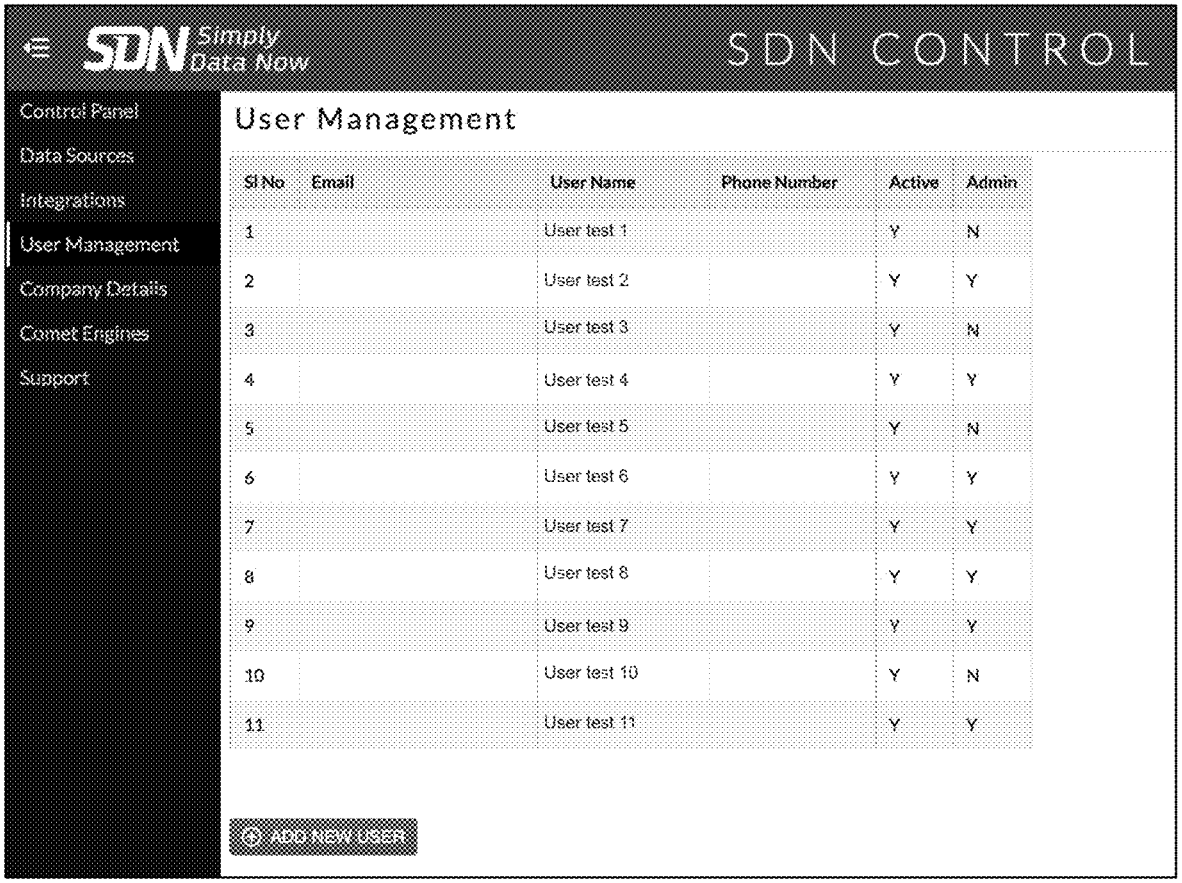
Figure 42B:
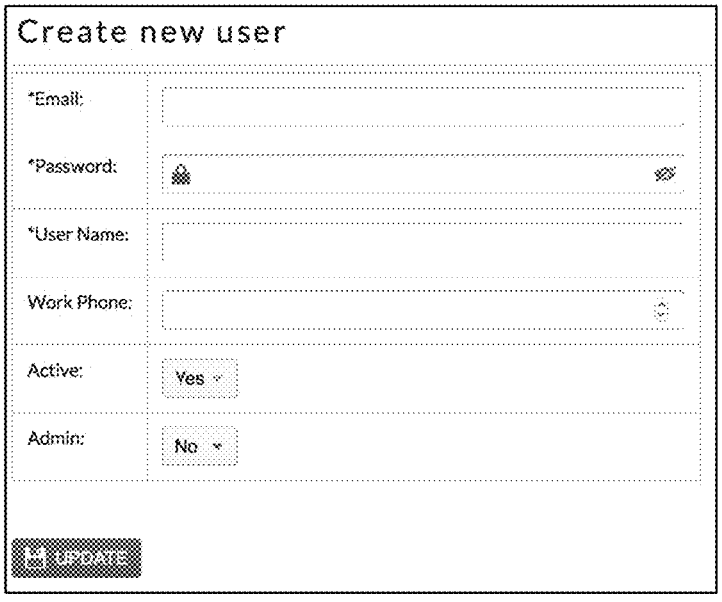
Figure 43:

FIG. 38 illustrates one non-limiting exemplary embodiment of current active integrations within SDN Control 3000. Here, the user can select to add a new integration based on the previously defined data sources/comet engines as previously discussed with respect to FIGS. 36A-37E. FIGS. 39A-39C illustrate one non-limiting exemplary embodiment of a user interface portal for creating and configuring a new integration. In particular, the user may select the pre-defined data source origin and the data destination/target, including a table name prefix. FIGS. 40A-40C illustrate non-limiting exemplary embodiments of user interface display portals for a user to define a schedule and priority for the origin source and target destination selected in FIGS. 39A-39C. In particular, the user may define the run time amongst the options of daily, weekly, monthly, or yearly; a frequency; starting and ending times; a run window time frame or range; and priority level, among others. FIG. 39 illustrates one non-limiting exemplary embodiment of a user interface display or portal for defining specific tables and fields for the integration operation, and once selected and configured, the integration configuration step may be complete. At this stage the comet engines associated with the integration may begin pinging operations for pulling and pushing data, as previously discussed in the disclosure described herein. FIGS. 42A-42B illustrate one non-limiting exemplary embodiment of a user management user interface display or portal, wherein the users of the SDN Control network can be viewed, modified, added, and/or removed. FIG. 43 illustrates a user interface display for configuring a client, customer, or company information.

Figure 44:
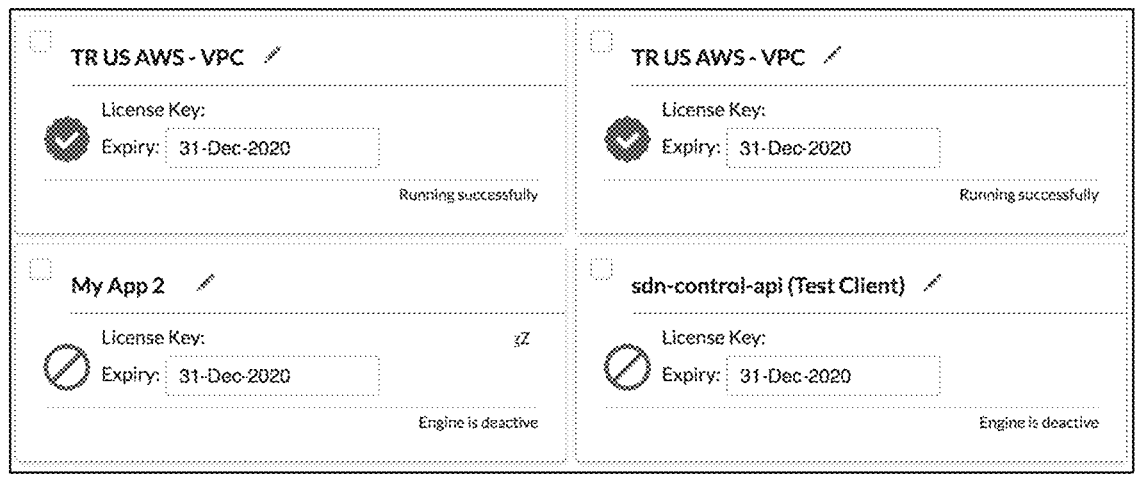

FIG. 44 illustrates one non-limiting exemplary embodiment of a user interface display or portal for viewing active or inactive comet engines. In particular, each comet engine of the disclosure described herein may have a license key associated with it, wherein such licensing and license key information is managed by one or more operations of SDN Control 3000. In addition, each installed comet engine can have an expiry date based on the client network systems' subscription to the SDN Control network/system and/or arrangement. Specifically, upon expiry of a license key for a specific comet engine on a client network system, then that comet engine may cease to operate and go off-line. Alternatively, one or more operators of SDN Control can activate any pre-installed comet engine on a client's network system. Similarly, one or more operators of SDN Control may also de-activate a particular comet engine.

It will be apparent to those skilled in the art that various modifications and variations can be made in the disclosed method, system, and computer program. It will also be apparent to those skilled in the art that while the method of operating the disclosure described herein with a specific order, that specific order is not required. Other embodiments will be apparent to those skilled in the art from consideration of the specification and practice of the disclosed embodiments herein. It is intended that the specification and examples be considered as exemplary only, with a true scope of the disclosure being indicated by the following claims

What is claimed is:

1. A method of extracting data from one or more data sources and loading the data into one or more destinations, the method comprising:
    deploying one or more continuously pinging active data engines into one or more user network systems, wherein the one or more data engines operate on one or more servers within the user network systems;
    receiving input with respect to a first data source;
    receiving input with respect to a second data destination;
    receiving input with respect to one or more user-defined data or metadata stored on the first data source;
    receiving input with respect to linking the first data source and second data destination to one or more of the deployed data engines;
    pinging continuously, via the one or more data engines, to discover requests to extract and direct the user defined data or metadata from the first data source;

retrieving, via the one or more data engines, the user-defined data or metadata from the first data source;

storing the retrieved user-defined data or metadata within an intermediary database; and retrieving, via the one or more data engines, the stored user-defined data from the intermediary database and loading it into the second data destination.

2. The method of claim 1, wherein the pinging is further comprise of discovering requests, instructions, jobs, or schedules from a central server.

3. The method of claim 1, further comprising encrypting, via the one or more data engines, the user-defined data or metadata from the first data source.

4. The method of claim 1, wherein the user-defined data or metadata is comprised of table data and table fields.

5. The method of claim 1, further comprising receiving priority and scheduling data with respect to the first data source or second data destination.

* * * * *